(12) United States Patent
Gopalakrishnan et al.

(10) Patent No.: US 9,578,530 B2
(45) Date of Patent: Feb. 21, 2017

(54) METHOD AND APPARATUS FOR DETERMINING CELL STATES TO ADJUST ANTENNA CONFIGURATION PARAMETERS

(71) Applicant: Futurewei Technologies, Inc., Plano, TX (US)

(72) Inventors: Nandu Gopalakrishnan, Chatham, NJ (US); Yanjie Fu, Harrison, NJ (US); James Matthew, Bellemead, NJ (US); Yan Xin, Princeton, NJ (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 0 days.

(21) Appl. No.: 14/971,870

(22) Filed: Dec. 16, 2015

(65) Prior Publication Data

US 2016/0165469 A1 Jun. 9, 2016

Related U.S. Application Data

(63) Continuation-in-part of application No. 14/963,062, filed on Dec. 8, 2015.
(Continued)

(51) Int. Cl.
*H04B 1/00* (2006.01)
*H04B 15/00* (2006.01)
(Continued)

(52) U.S. Cl.
CPC ............. *H04W 24/08* (2013.01); *H04W 16/28* (2013.01); *H04W 24/02* (2013.01)

(58) Field of Classification Search
CPC ...... H04W 24/04; H04W 24/08; H04W 24/10; H04W 52/243
(Continued)

(56) References Cited

U.S. PATENT DOCUMENTS

2004/0201526 A1 10/2004 Knowles et al.
2009/0279519 A1* 11/2009 Brisebois ............ H04W 52/242
370/338
(Continued)

FOREIGN PATENT DOCUMENTS

CN 101557654 A 10/2009
CN 102202330 A 9/2011
(Continued)

OTHER PUBLICATIONS

International Search Report and Written Opinion dated Mar. 4, 2016 in International Patent Application No. PCT/CN2015/097666, 12 pages.
(Continued)

*Primary Examiner* — Simon Nguyen
(74) *Attorney, Agent, or Firm* — Futurewei Technologies, Inc.

(57) ABSTRACT

A method for determining cell states to adjust antenna configuration parameters includes receiving, at a radio access nodes in a network, measurement reports from a plurality of user equipment devices. The radio access node performs a weak coverage analysis in response to the measurement reports to determine whether a cell provided by the radio access node is assigned a good coverage state or a weak coverage state. The radio access node performs an overshooting analysis in response to the measurement reports to determine whether the cell provided by the radio access node is assigned an overshooter state or a non-overshooter state. The radio access node performs an interference analysis in response to the measurement reports to determine whether the cell provided by the radio access node is assigned an interferer state or a non-interferer state. The radio access node performs a quality analysis in response to the measurement reports to determine whether the cell provided by the radio access node is assigned a good (Continued)

quality state or a bad quality state. Adjustments are made to antenna configuration parameters of the cell provided by the radio access node in response to the various states assigned to the cell.

23 Claims, 28 Drawing Sheets

Related U.S. Application Data

(60) Provisional application No. 62/089,654, filed on Dec. 9, 2014, provisional application No. 62/096,439, filed on Dec. 23, 2014, provisional application No. 62/093,283, filed on Dec. 17, 2014, provisional application No. 62/099,854, filed on Jan. 5, 2015, provisional application No. 62/100,003, filed on Jan. 5, 2015.

(51) Int. Cl.
*H04B 17/00* (2015.01)
*H04W 24/08* (2009.01)
*H04W 16/28* (2009.01)
*H04W 24/02* (2009.01)

(58) Field of Classification Search
USPC .................. 455/67.11, 67.13, 63.2, 517, 524
See application file for complete search history.

(56) References Cited

U.S. PATENT DOCUMENTS

| | | | | |
|---|---|---|---|---|
| 2011/0287762 | A1* | 11/2011 | Kumar | H04W 24/08 455/424 |
| 2012/0106370 | A1* | 5/2012 | Radulescu | H04W 36/0083 370/252 |
| 2012/0220291 | A1* | 8/2012 | Olsson | H04W 76/028 455/423 |
| 2014/0036656 | A1* | 2/2014 | Chou | H04W 24/04 370/216 |
| 2014/0329528 | A1* | 11/2014 | Zhao | H04W 36/30 455/436 |
| 2015/0052255 | A1* | 2/2015 | Sun | H04L 49/253 709/227 |
| 2015/0056981 | A1* | 2/2015 | Song | H04W 24/04 455/423 |
| 2015/0141027 | A1* | 5/2015 | Tsui | H04W 52/243 455/452.1 |
| 2015/0223084 | A1* | 8/2015 | Lightstone | H04W 24/08 370/252 |
| 2015/0373563 | A1* | 12/2015 | Chou | H04W 36/14 370/252 |
| 2016/0029253 | A1* | 1/2016 | Sarkar | H04W 36/0016 455/436 |
| 2016/0080061 | A1 | 3/2016 | Yang et al. | |

FOREIGN PATENT DOCUMENTS

| | | |
|---|---|---|
| CN | 102300221 A | 12/2011 |
| CN | 103152755 A | 6/2013 |
| CN | 103906073 A | 7/2014 |
| KR | 20110014806 A | 2/2011 |
| WO | 2014190472 A1 | 12/2014 |

OTHER PUBLICATIONS

International Search Report and Written Opinion dated Mar. 8, 2016 in International Patent Application No. PCT/CN2015/096816, 11 pages.

* cited by examiner

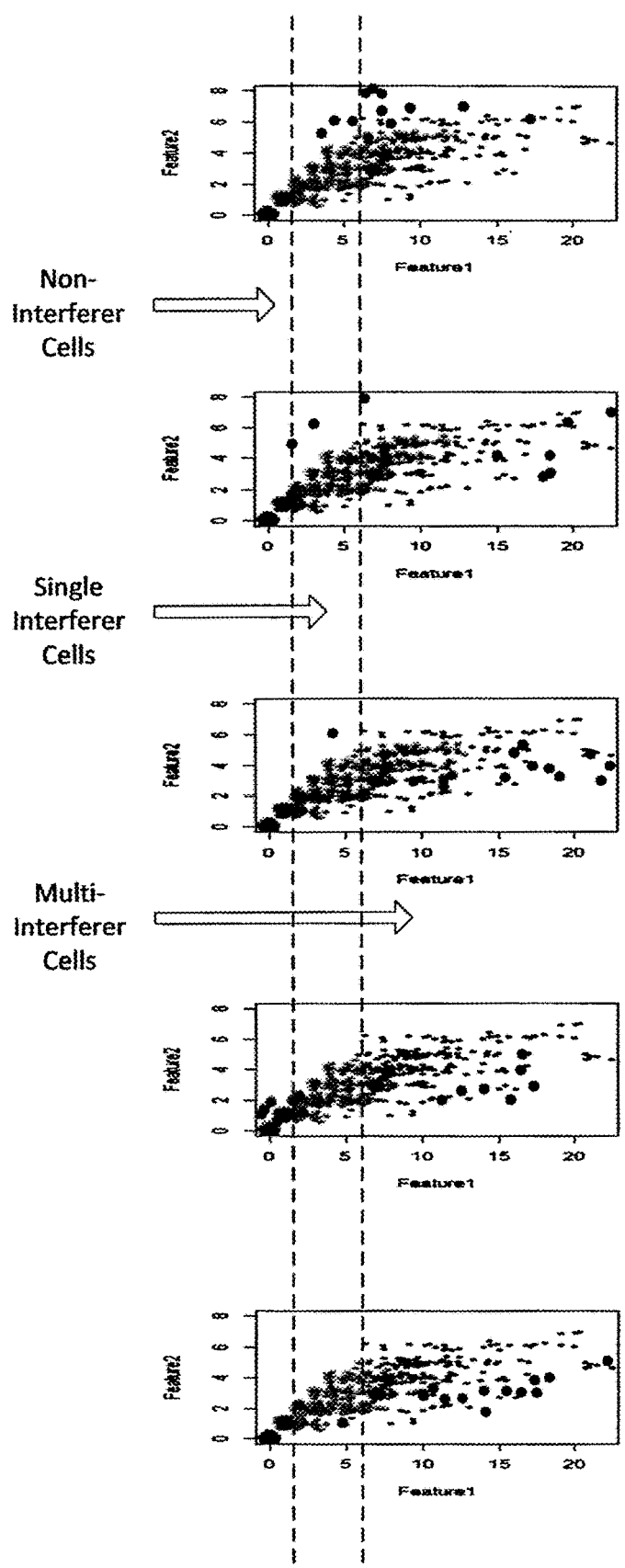
FIG. 3A After Iteration 1
FIG. 3B After Iteration 4
FIG. 3C After Iteration 7
FIG. 3D After Iteration 9
FIG. 3E After Iteration 10

After Iteration 1

After Iteration 4

After Iteration 7

After Iteration 9

After Iteration 10

Iteration 1

■ RSRP

■ LTE RSRP(dBm)>0
■ -50<LTE RSRP(dBm)<=0
■ -80<LTE RSRP(dBm)<=-50
■ -90<LTE RSRP(dBm)<=-80
■ -100<LTE RSRP(dBm)<=-90
■ -105<LTE RSRP(dBm)<=-100
■ -110<LTE RSRP(dBm)<=-105
■ -120<LTE RSRP(dBm)<=-110
■ LTE RSRP(dBm)<=-120

■ RS SINR

■ 25<LTE RS SINR(dB)<=60
■ 20<LTE RS SINR(dB)<=25
■ 15<LTE RS SINR(dB)<=20
■ 10<LTE RS SINR(dB)<=15
■ 5<LTE RS SINR(dB)<=10
■ 0<LTE RS SINR(dB)<=5
■ -5<LTE RS SINR(dB)<=0
■ LTE RS SINR(dB)<=-5

Start new round without waiting for other cells to finish their current round (Max # of Round = 3)

| | Cell 1 | | | | Cell 2 | | | | Cell 3 | | |
|---|---|---|---|---|---|---|---|---|---|---|---|
| Iteration # | Round # | New e Tilt Direction | Gain | Accept e Tilt Direction? | Round # | New e Tilt Direction | Gain | Accept e Tilt Direction? | Round # | New e Tilt Direction | Gain | Accept e Tilt Direction? |
| 1 | 1 | Uptilt | Positive | YES | 1 | Uptilt | Negative | NO | 1 | Uptilt | Positive | YES |
| 2 | 1 | Uptilt | Positive | YES | 1 | Downtilt | Negative | NO | 1 | Uptilt | Positive | YES |
| 3 | 1 | Uptilt | Positive | YES | 2 | Uptilt | Positive | YES | 1 | Uptilt | Negative | NO |
| 4 | 1 | Uptilt | Negative | YES | 2 | Uptilt | Negative | YES | 1 | Downtilt | Positive | YES |
| 5 | 1 | Uptilt | Positive | YES | 2 | Uptilt | Negative | NO | 1 | Downtilt | Negative | YES |
| 6 | 1 | Uptilt | Positive | YES | 3 | Downtilt | Positive | YES | 1 | Downtilt | Negative | NO |
| 7 | 1 | Uptilt | Negative | YES | 3 | Downtilt | Negative | YES | 2 | Uptilt | Positive | YES |
| 8 | 1 | Uptilt | Negative | NO | 3 | Downtilt | Positive | YES | 2 | Uptilt | Negative | NO |
| 9 | 1 | Downtilt | Positive | YES | 3 | Downtilt | Negative | NO | 2 | Downtilt | Positive | YES |
| 10 | 1 | Downtilt | Positive | YES | 3 | No Change | | | 2 | Downtilt | Negative | NO |
| 11 | 1 | Downtilt | Positive | YES | 3 | No Change | | | 3 | Uptilt | Negative | NO |
| 12 | 1 | Downtilt | Negative | NO | 3 | No Change | | | 3 | Downtilt | Negative | NO |

FIG. 26

Start new round only if all other cells finish their current round

| | Cell 1 | | | | Cell 2 | | | | Cell 3 | | |
|---|---|---|---|---|---|---|---|---|---|---|---|
| Iteration # | Round # | New e Tilt Direction | Gain | Accept e Tilt Direction? | Round # | New e Tilt Direction | Gain | Accept e Tilt Direction? | Round # | New e Tilt Direction | Gain | Accept e Tilt Direction? |
| 1 | 1 | Uptilt | Positive | YES | 1 | Uptilt | Negative | NO | 1 | Uptilt | Positive | YES |
| 2 | 1 | Uptilt | Positive | YES | 1 | Downtilt | Negative | NO | 1 | Uptilt | Positive | YES |
| 3 | 1 | Uptilt | Negative | YES | 1 | No Change | | | 1 | Uptilt | Negative | YES |
| 4 | 1 | Uptilt | Positive | YES | 1 | No Change | | | 1 | Uptilt | Negative | NO |
| 5 | 1 | Uptilt | Negative | YES | 1 | No Change | | | 1 | Downtilt | Positive | YES |
| 6 | 1 | Uptilt | Negative | NO | 1 | No Change | | | 1 | Downtilt | Positive | YES |
| 7 | 1 | Downtilt | Positive | YES | 1 | No Change | | | 1 | Downtilt | Negative | NO |
| 8 | 1 | Downtilt | Positive | YES | 1 | No Change | | | 1 | No Change | | |
| 9 | 1 | Downtilt | Negative | NO | 1 | No Change | | | 1 | No Change | | |
| 10 | 2 | Uptilt | Positive | YES | 2 | Uptilt | Negative | NO | 2 | Uptilt | Negative | YES |
| 11 | 2 | Uptilt | Positive | YES | 2 | Downtilt | Negative | NO | 2 | Uptilt | Positive | YES |
| 12 | 2 | Uptilt | Positive | YES | 2 | No Change | | | 2 | Uptilt | Negative | NO |

FIG. 27

METHOD AND APPARATUS FOR DETERMINING CELL STATES TO ADJUST ANTENNA CONFIGURATION PARAMETERS

RELATED APPLICATION

The present application is a continuation-in-part of and claims priority to U.S. non-provisional patent application Ser. No. 14/963,062 filed on Dec. 8, 2015, which claims priority to the following U.S. provisional applications:

U.S. Provisional Application No. 62/089,654 filed Dec. 9, 2014;

U.S. Provisional Application No. 62/096,439 filed Dec. 23, 2014;

U.S. Provisional Application No. 62/093,283 filed Dec. 17, 2014;

U.S. Provisional Application No. 62/099,854 filed Jan. 5, 2015; and

U.S. Provisional Application No. 62/100,003 filed Jan. 5, 2015.

All of these are hereby incorporated herein by reference.

TECHNICAL FIELD

The present disclosure relates in general to self-organizing networks and coverage capacity optimization and more particularly to a method and apparatus for determining cell states to adjust antenna configuration parameters.

BACKGROUND

A self-organizing network (SON) is an automation technology designed to make the planning, configuration, management, optimization, and healing of mobile radio access networks simpler and faster. SON functionality and behavior has been defined and specified in generally accepted mobile industry recommendations produced by organizations such as 3rd Generation Partnership Project (3GPP) and Next Generation Mobile Networks (NGMN). SON is considered critical to operators' strategy for meeting the exploding demand for data in the coming decade—the era of the Internet of Things. SON is considered necessary to automate operations and optimize performance in a scalable manner for small cell driven heterogeneous networks (HetNets). As SON evolves it will be run on Big Data platforms in the cloud powered by "intelligent" predictive analytics algorithms.

Coverage Capacity Optimization (CCO) is a SON use case that initially configures and adjusts key RF parameters (antenna tilt and azimuth configuration and power) post-deployment to maximize some measure of user quality of experience (QoE) (in particular, coverage, quality and capacity) and adapt to changing traffic patterns and changes in environment. CCO is expected to work on a long time-scale in the order of hours/days to capture and react to long term or seasonal changes in traffic and environment and also allow for sufficient data collection for accurate observation and estimation of CCO performance.

A current CCO solution is known as Automatic Cell Planner (ACP). ACP uses measure report (MR) and drive test (DT) data with user equipment (UE) geo-location data obtained through Assisted Global Positioning System (AGPS) and accurate antenna configuration parameters for accurate propagation modeling. However, ACP being a modeling approach requires costly drive testing and human verification. For ACP, knowledge of UE locations is essential and obtaining accurate antenna configuration parameters is subject to human error. Moreover, ACP is not scalable to small cells and HetNets as too much manual effort is required for setup and verification.

SUMMARY

From the foregoing, it may be appreciated by those skilled in the art that a need has arisen for a technique to determine a cell state that does not require UE location, accurate antenna configuration parameters, or offline modeling. In accordance with the present disclosure, a method and apparatus for determining cell states to adjust antenna configuration parameters are provided that greatly reduce or substantially eliminate problems and disadvantages associated with current SON CCO solutions.

According to an embodiment, there is provided a method for determining cell states to adjust antenna configuration parameters that includes receiving, at a radio access nodes in a network, measurement reports from a plurality of user equipment devices. The radio access node performs a weak coverage analysis in response to the measurement reports to determine whether a cell provided by the radio access node is assigned a good coverage state or a weak coverage state. The radio access node performs an overshooting analysis in response to the measurement reports to determine whether the cell provided by the radio access node is assigned an overshooter state or a non-overshooter state. The radio access node performs an interference analysis in response to the measurement reports to determine whether the cell provided by the radio access node is assigned an interferer state or a non-interferer state. The radio access node performs a quality analysis in response to the measurement reports to determine whether the cell provided by the radio access node is assigned a good quality state or a bad quality state. Adjustments are made to antenna configuration parameters of the cell provided by the radio access node in response to the various states assigned to the cell.

The present disclosure describes many technical advantages over conventional system behavior and performance analysis techniques. For example, one technical advantage is to provide an ability to determine one or more states of a cell based on UE MR data from an actual network and not based on data obtained through a modeled network. Another technical advantage is to identify a cell as being any of a weak or non-weak coverage cell, an interfering or non-interfering cell, an overshooting or non-overshooting cell, and a good or poor quality cell. Yet another technical advantage is to use a cell state to determine adjustments made to the corresponding antenna configuration parameters based on received MR information without the need for UE location or accurate antenna configuration information. Other technical advantages may be readily apparent to and discernable by those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which:

FIGS. 3A-3E illustrate example graphs of global historical data categorizing interfering cells for a plurality of LTE networks;

FIG. 26 illustrates a graph depicting simulation results obtained by performing the method described in FIG. 25;

FIG. 27 illustrates another graph depicting additional simulation results obtained by performing the method described in FIG. 25.

DETAILED DESCRIPTION

FIGS. 1 through 28, discussed below, and the various embodiments used to describe the principles of the present disclosure in this patent document are by way of illustration only and should not be construed in any way to limit the scope of the disclosure. Those skilled in the art will understand that the principles of the disclosure may be implemented in any type of suitably arranged device or system. Features shown and discussed in one figure may be implemented as appropriate in one or more other figures.

Figure 1:
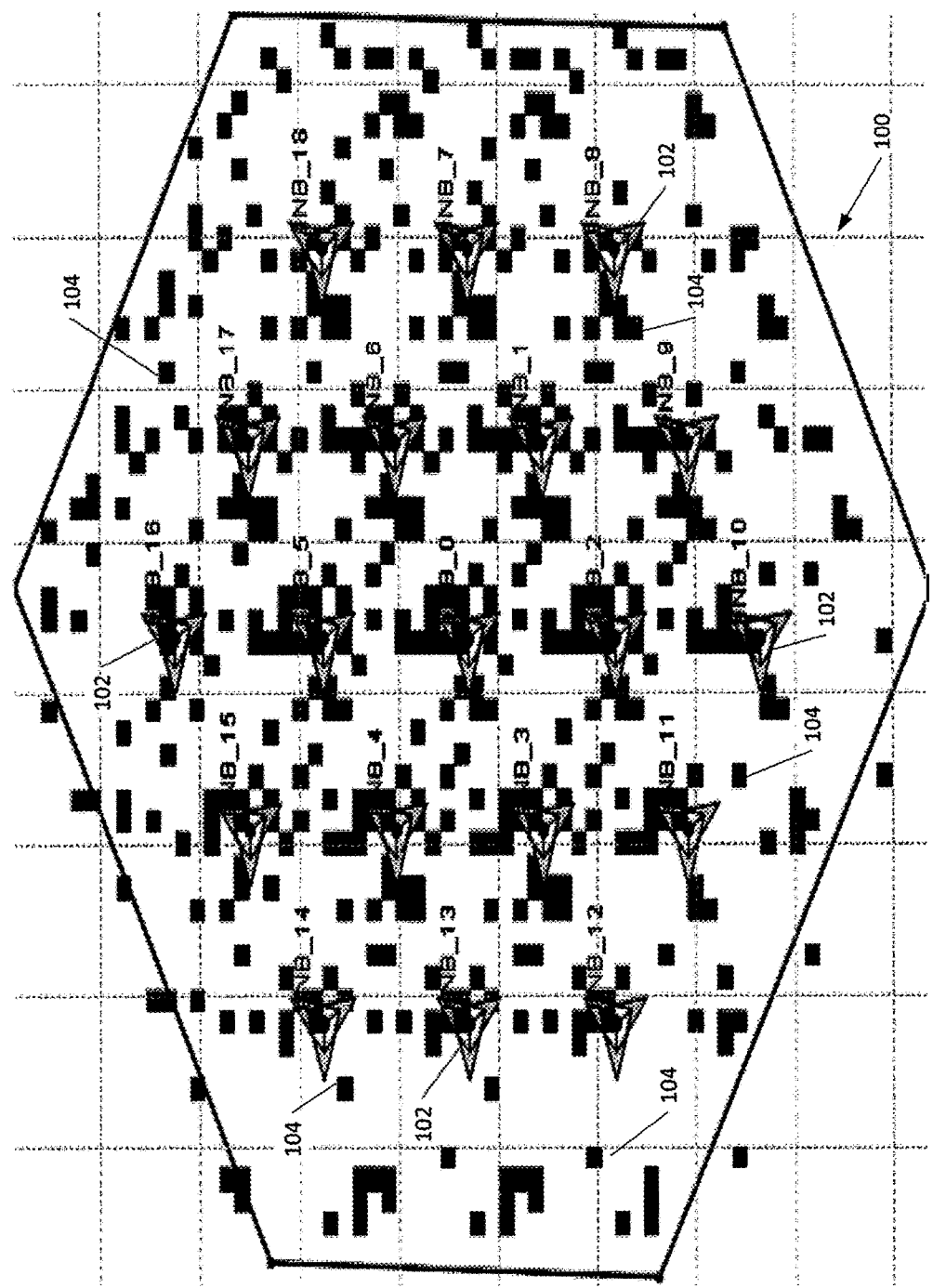
FIG. 1 illustrates an example of a Long Term Evolution (LTE) network.

FIG. 1 shows an example of a Long Term Evolution (LTE) network 100. LTE network 100 is a type of wireless communications network designed to provide broadband Internet and phone service to user equipment (UE) such as mobile phones and other types of devices. Voice calls on an LTE network are converted into small chunks of data, which eliminates the need for separate voice circuits. These types of networks are often marketed as "4G" and are capable of offering speeds that rival wired broadband services. They also offer increased capacity, which may help wireless carriers deal with the increasing amounts of data used by smart phones and other devices. Though discussed in terms of LTE network 100, the present disclosure may also be applicable to other known or future wireless communications networks.

In the example of FIG. 1, LTE network 100 is partitioned into multiple cells provided by 19 Evolved Node B (eNB) radio access nodes 102. The eNB radio access nodes 102 provide service for multiple UE devices 104. The number of eNB radio access nodes 102 and UE devices 104 operating within LTE network 100 may be greater or fewer than what is depicted in FIG. 1. Each eNB radio access node 102 is responsible for radio transmission and reception with UE devices 104 in one or more cells. Each eNB radio access node 102 controls the radio resources of its own cells and provides functions for configuring and making measurements on the radio environment.

Optimizing Cell Specific Antenna Configuration Parameters

Figure 2:
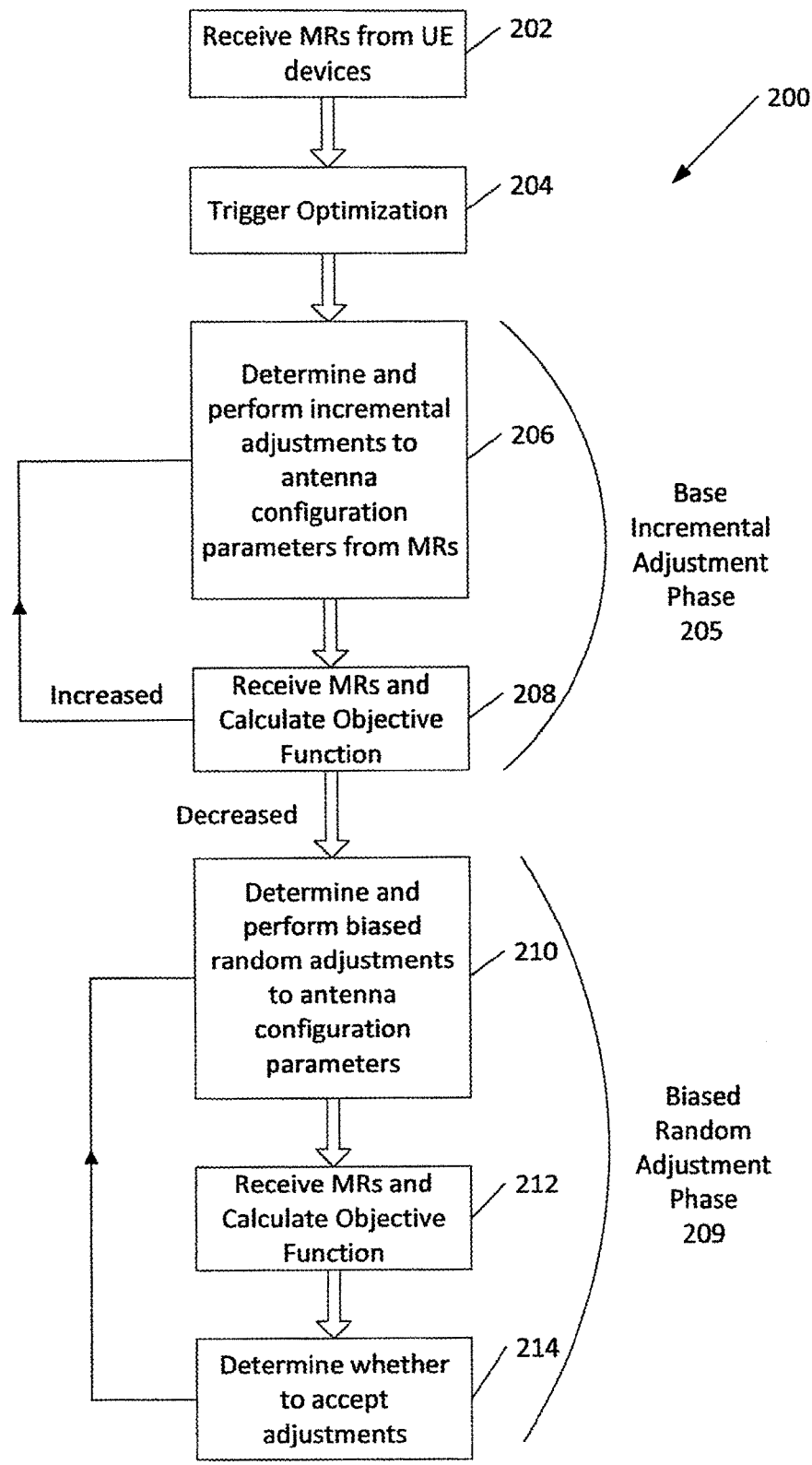
FIG. 2 illustrates an example process for optimizing cell specific antenna configuration parameters.
Figure 4A:
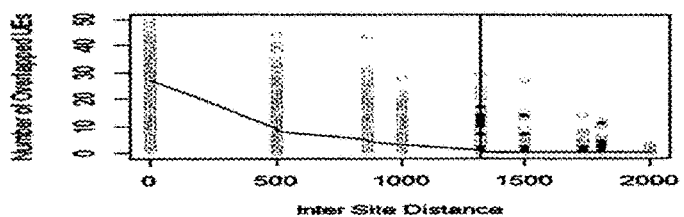
FIGS. 4A-4E illustrate example graphs categorizing cells as overshooter cells.
Figure 4B:
Figure 4C:
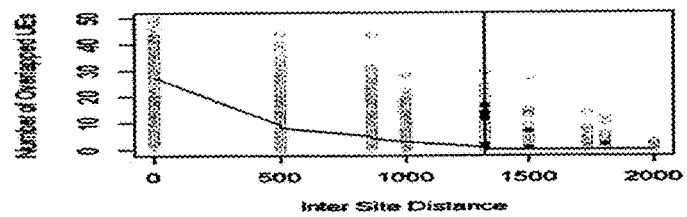
Figure 4D:
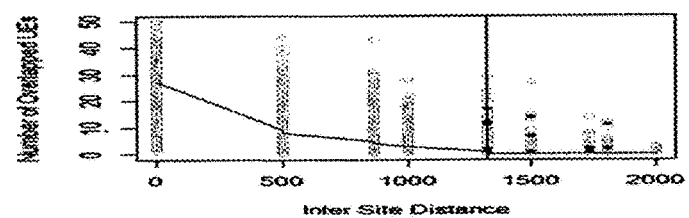
Figure 4E:
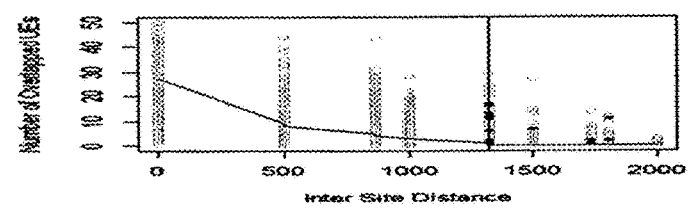

FIG. 2 shows a process 200 for optimizing performance in LTE network 100. In general, process 200 adjusts antenna configuration parameters incrementally online, jointly, and per cluster. Process 200 observes the resultant feedback from measurement reports (MRs) transmitted by UE devices 104 and continues in a closed loop to optimize over the long run. Antenna configuration parameters include electronic tilt, azimuth, and reference symbol power. Feedback from actual UE devices 104 is used in the form of MRs, as opposed to propagation model estimates. As known in the art, the MRs can include multiple UE-related and cell-related parameters, such as cell ID, reference signal received power (RSRP), reference signal received quality (RSRQ), serving cell ID, and timing advance parameters. The information in the MRs is used to update an objective function representing network performance, identify cell state indicator metrics/labels, and make step-wise antenna configuration parameter adjustments for performance progress. As known in the art, an objective function can be used for optimization of a measurable quantity, parameter, or feature, such as network performance. As used herein, the disclosed objective function can be used for optimization of network performance.

Process 200 does not need to know where UE devices 104 are located within LTE network 100 nor the exact antenna configuration parameter values in order to optimize performance. This contrasts with propagation model aided solutions (such as ACP) that require accurate user location and correct antenna configuration parameter values for each cell. Because correct configuration parameter values are not known, even if initial configuration parameters are erroneous, the antenna configuration parameter values can still be adjusted in a meaningful direction due to the fact that parameter changes lead to measurable change in cell/system metrics. As long as MRs (including RSRP, RS-SINR RSRQ, or the like) from representative UE devices 104 (e.g., UE devices 104 selected by unbiased random sampling) are available for a given antenna configuration parameter change, the objective function can be evaluated accurately.

In the disclosed embodiments, every MR that is adjudged to have "failed" a coverage criterion (e.g., by virtue of a reported reference channel signal strength not meeting a pre-defined threshold) or a quality criterion (e.g., by virtue of a reported reference channel quality, i.e., signal to interference plus noise, not meeting another pre-defined threshold) assigns a notional unit of "blame" for such failure to a "responsible" cell or cells. If multiple cells are held responsible, fractional units of "blame" (or "shares of blame") are assigned to each responsible cell. When aggregated over all "failed" MRs, blame metrics can be calculated for each cell, and a base incremental action (e.g., antenna tilt or transmit power adjustment) can be taken by the cell in accordance with such blame metrics in order to reduce the rate of occurrence of MR failures.

Process 200 employs two closed loop phases—a base incremental adjustment phase 205 and a biased random adjustment phase 209. In the base incremental adjustment phase 205, cell level features or blame metrics are calculated from the MRs and, alternatively or in addition, cells are labeled according to a coverage, quality, interference, or overshooter state (described in greater detail below with respect to FIGS. 4A-4E) that map to "intuitively correct" adjustment directions for the antenna configuration parameters based on domain knowledge applied simultaneously on multiple cells in order to quickly grab big initial gains. Embodiments for determining cell states are described in greater detail later in this disclosure. MRs are processed to derive cell level metrics accounting for every cell's share of blame for measurement reports indicating inadequate coverage or quality. The cell level metrics determine what base incremental adjustments are made to that cell's antenna configuration parameters. Alternatively or in addition, MRs are processed to derive intuitive cell labels or combinations of cell labels indicating any of coverage, quality, interference, and overshooter state of each cell. The one or more labels attached to a cell determine the base incremental adjustments made to that cell's antenna configuration parameters.

The biased random adjustment phase 209 represents a mathematical search procedure that performs explorative techniques and chooses oppositional or random initial directions. Adjustments are accepted when the objective function is improved and accepted with decreasing probability as the objective function worsens and with passage of time (cooling) to steadily improve the solution. Over time, exploration direction can be conditioned to learn from mistakes and, in a later explorative pass, the action learned to be best (in the sense of maximizing instantaneous or cumulative rewards) for a given cell state is chosen. The key facts being exploited are that the system objective function and cell level metrics are aggregations of UE state information (MR) that don't require individual UE locations for evaluation, and that parameter changes matter but not the absolute value.

Process 200 begins at block 202 with the receipt of MRs from UE devices 104. Initiation of the optimization process is triggered at block 204. Optimization may be triggered manually, by network conditions, or automatically based on key performance indicators (KPIs) within LTE network 100. Examples of KPIs include call drop rate and call block rate. Other KPIs are known to those of skill in the art. If analysis of KPIs identify a degradation in network performance, then optimization is triggered. Upon triggering of optimization, process 200 proceeds to the base incremental adjustment phase 205, which includes blocks 206 and 208.

In the base incremental adjustment phase 205, MRs are used in block 206 to determine a direction of adjustment to the antenna configuration parameters (i.e., whether to adjust an antenna configuration parameter up or down). Only the direction of change is determined and not the specific current or starting values of the antenna configuration parameters. The direction of adjustment may be determined in several ways. In one example, the direction of change for each antenna configuration parameter is determined by a blame action metric where a majority rule of UE devices 104 provide MRs indicating a certain change in a direction (up or down) for a respective parameter. In another example, each cell is labeled with a cell state based on the MRs received from UE devices 104. A cell may be given one or more labels identifying a state of the cell, such as an interferer, non-interferer, good/weak coverage, good/weak quality, overshooter, and non-overshooter. Here, interference refers to downlink interference in the cell. These labels are typically determined based on a comparison with one or more thresholds. The exact determination of these thresholds is beyond the scope of this disclosure. The labels given to a particular cell determine the change in direction for the antenna configuration parameters associated with that particular cell.

FIGS. 3A-3E show example graphs of global historical data categorizing interfering cells for a plurality of LTE networks. A cell is given an interferer label based on membership in a group cluster. The global historical data categorizes cells as non-interferer, single interferer, or multi-interferer, based on how many nearby cells experience interference from the given cell. The category a cell falls into determines its interferer label. The type of interferer label given to a particular cell determines the direction of adjustments made to the cell's antenna configuration parameters. After an adjustment is made to the antenna configuration parameters, a cell may fall into a different interferer category based on returned MRs from UE devices 104. FIGS. 3A-3E show how cells may move across interferer categories during various iterations of the base incremental adjustment phase 205. For example, looking at the larger circular dots in FIGS. 3A-3E, it can be seen that many of the larger dots improve toward a non-interferer state through iteration 9 (FIG. 3D), but then cause greater interference and move to a multi-interferer state in iteration 10 (FIG. 3E).

FIGS. 4A-4E show example graphs categorizing cells as overshooter cells. An example of an overshooter cell is a cell that provides a high reference signal received power (RSRP) to a UE device 104 but is located some distance from the UE device 104. That is, an overshooter cell causes significant interference from a comparatively far distance (e.g., further than an adjacent cell). A cell labeled as an overshooter may have a particular direction of adjustments made to its antenna configuration parameters (e.g, a down power or down tilt). After an adjustment is made to the antenna configuration parameters, a cell may fall out of or into an overshooter state based on new MRs from UE devices 104, where the new MRs are determined after the adjustment to the antenna configuration parameters. FIGS. 4A-4E show how cells may move into and out of overshooter state during various iterations of the base incremental adjustment phase 205.

After each change in the antenna configuration parameters of the cells, the objective function for network optimization is calculated upon receiving new MRs in block 208 to determine if network performance improves. The objective function is based on a coverage parameter such as RSRP and a quality parameter such as signal to interference and noise ratio of the reference signal (RS-SINR). The objective function is determined by identifying those MRs having their RSRP parameter greater than a first threshold value and identifying those MRs having their RS-SINR parameter greater than a second threshold value. In some embodiments, the objective function is calculated according to the equation:

$$k1*\text{number of (RSRP>threshold1)}+k2*\text{number of (RS-SINR>threshold2)},$$

where k1 and k2 are non-negative numbers that sum to 1.0 and are determined in advance, e.g., by a system user (such as a network engineer) or automatically in a configuration routine. As long as network performance improves as indicated by an increase in the objective function, process 200 will loop through the base incremental adjustment phase 205 in blocks 206 and 208.

Upon identifying a decrease in the objective function in block 208, the base incremental adjustment phase 205 ends and the biased random adjustment phase 209 including blocks 210, 212, and 214 begins In the biased random adjustment phase 209, simulated annealing is performed where random direction changes are made to the antenna configuration parameters and chaotic jumps are made to escape local minima positions in order to steadily improve the objective function toward a global optimum level. The biased random direction changes are accepted upon obtaining an improvement in the objective function. If the objective function decreases, a probability factor is used in determining whether to accept the random direction changes. Table I shows an example of a simulated annealing algorithm.

TABLE I

| | |
|---|---|
| 1. | Obtain initial solution S and position T |
| 2. | Determine C as the cost of S |
| 3. | Generate new solution S' |
| 4. | Determine C' as the cost of S' |
| 5. | Accept S' as the current solution S with probability p: $p = \exp[(C - C')/T]$ if $C' \geq C$; $p = 1$ if $C' < C$ |
| 6. | If equilibrium level has not been reached, go to 3. |
| 7. | Update position T |
| 8. | If termination criterion has not been reached, go to 3. |

Figure 5:
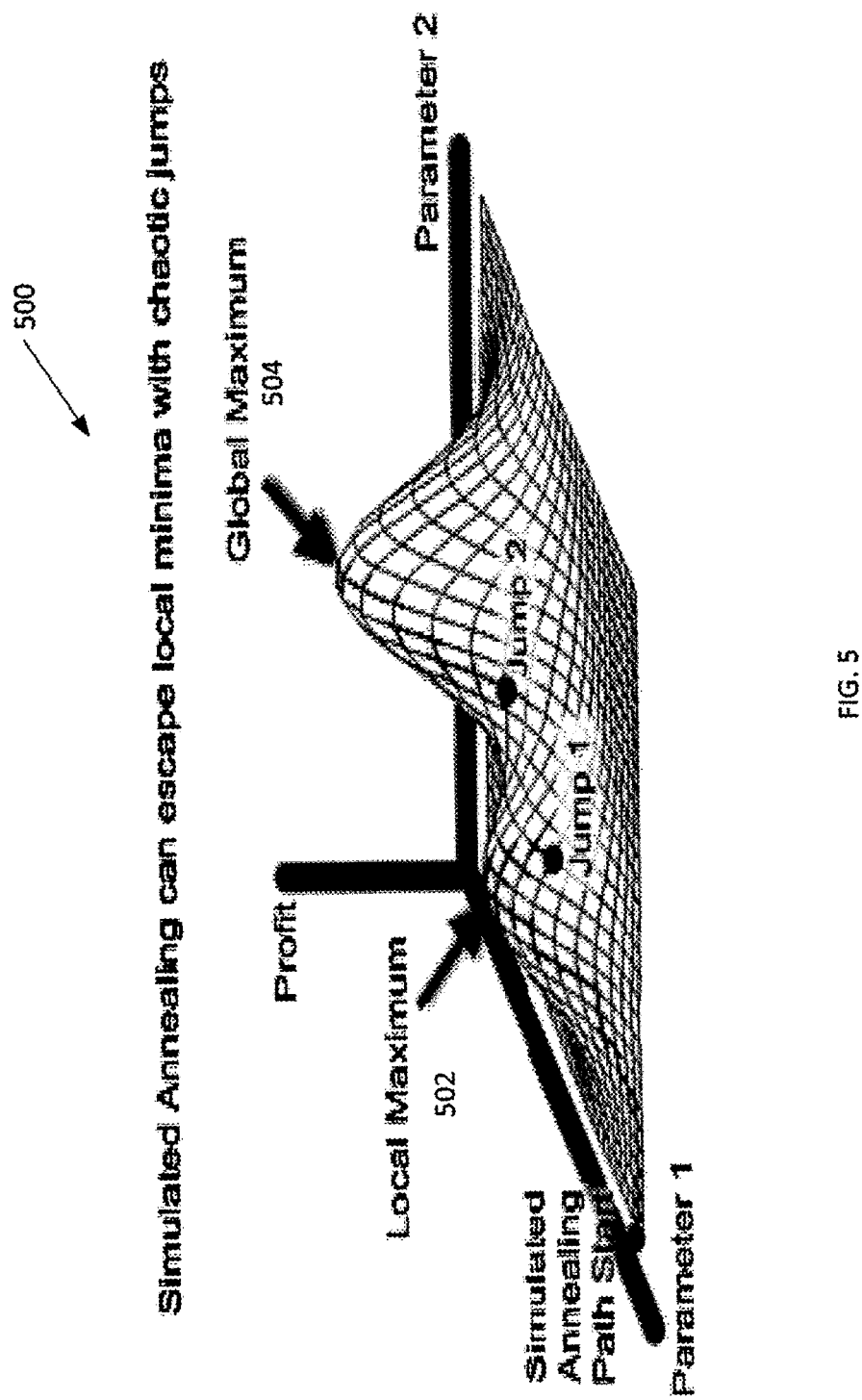
FIG. 5 illustrates a graph depicting an example simulated annealing process performed by the optimization process.

An example of the simulated annealing process that can be performed in the biased adjustment phase 209 is represented by the graph 500 in FIG. 5. The simulated annealing process may identify a local maximum 502 but may perform a chaotic jump (from Jump 1 to Jump 2) in order to locate a global maximum 504. Here, the maximums 502, 504 are determined maximums of the objective function described above. In terms of the present disclosure, biased random adjustments are determined and performed in block 210. After the biased random adjustments have been made, new MRs are received and used to calculate the objective function in block 212. A determination is made as to whether to accept or discard the adjustments based at least on the recalculated objective function in block 214. If the biased random adjustments are discarded, alternative biased random adjustments may be determined when the process 200 returns to block 210. The biased random adjustment phase 209 continues to loop through blocks 210, 212, and 214 and fine tune the parameters until a convergence to a global maximum is reached.

Figure 6:
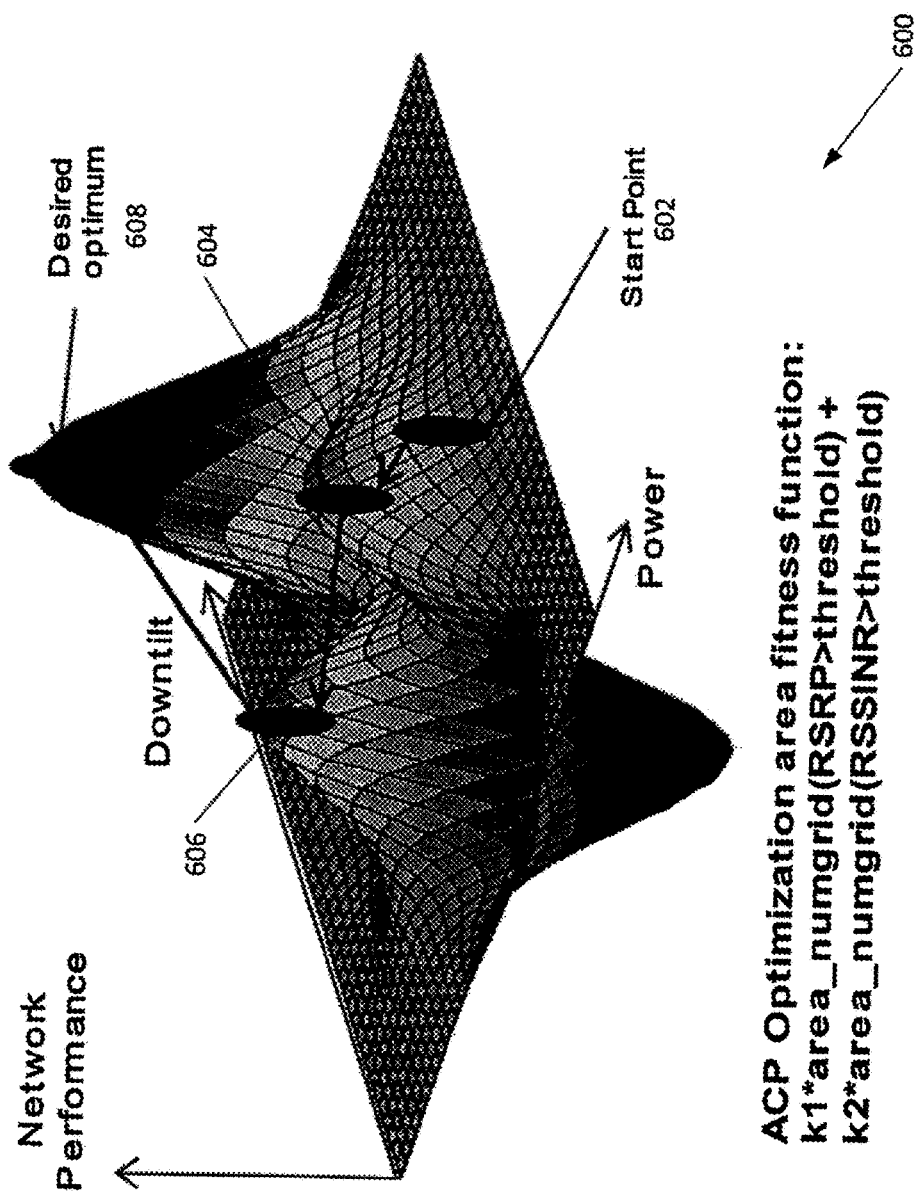
FIG. 6 illustrates a graph depicting network performance as a function of power and downtilt parameters.
Figure 7A:
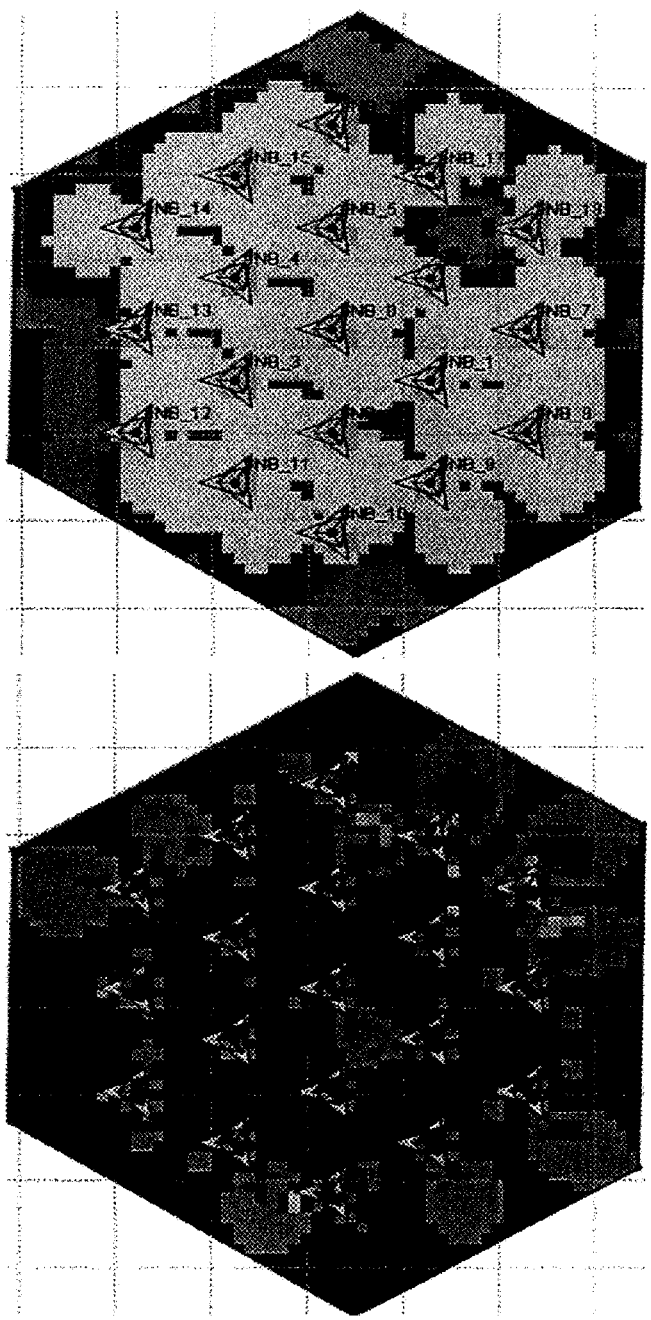
FIGS. 7A-7E illustrate changes in coverage and quality parameters in the LTE network through various iterations in a base incremental adjustment phase of the optimization process.
Figure 7B:
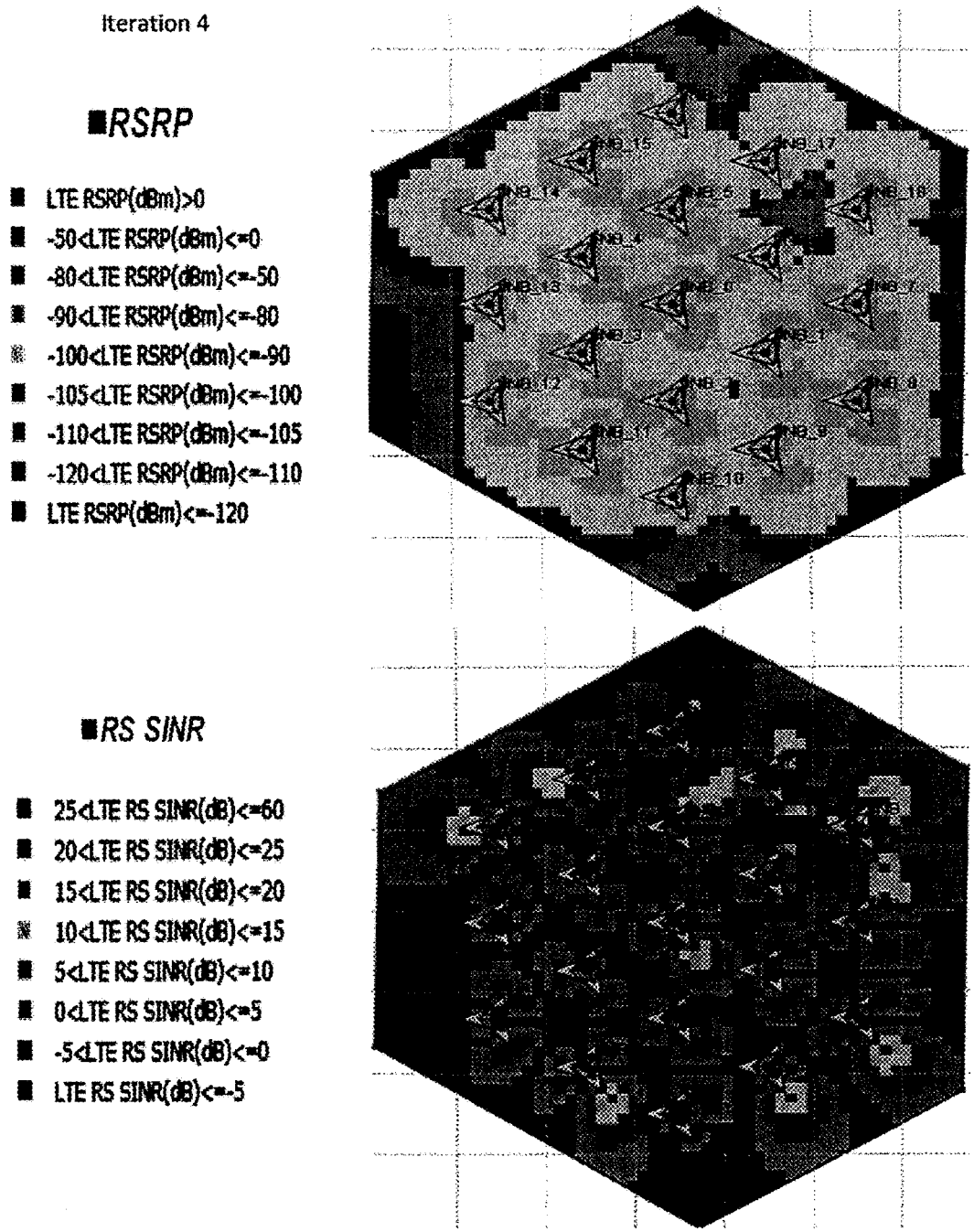
Figure 7C:
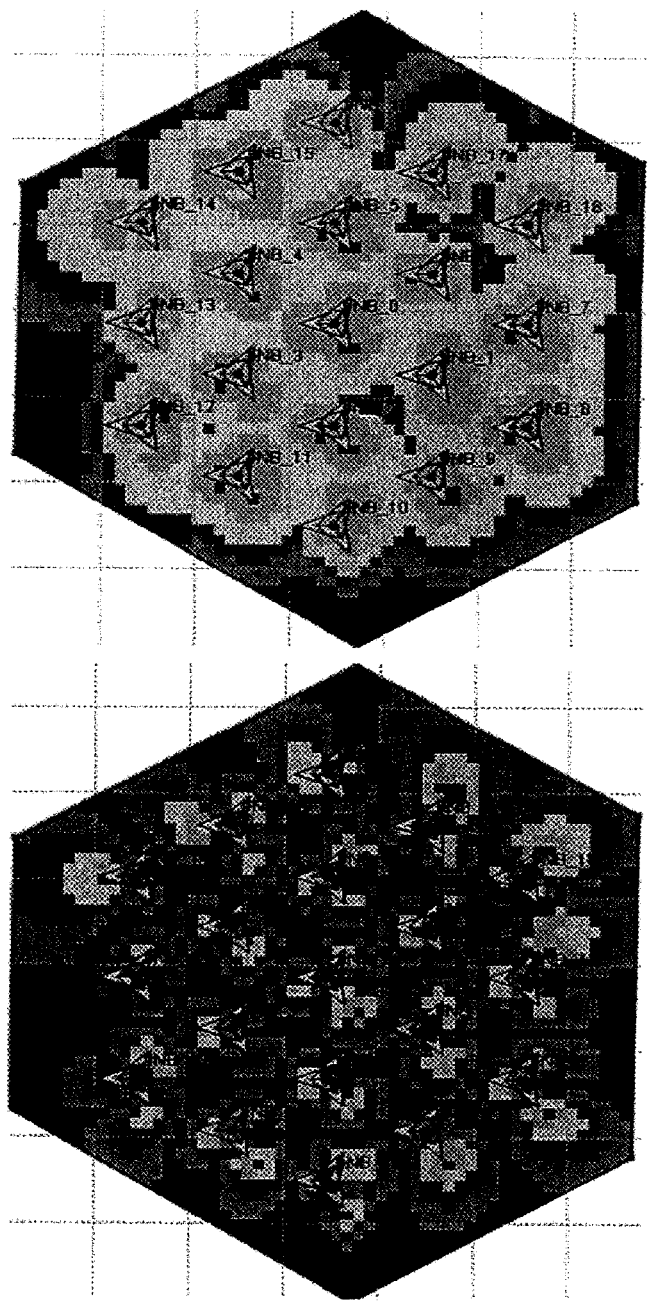
Figure 7D:
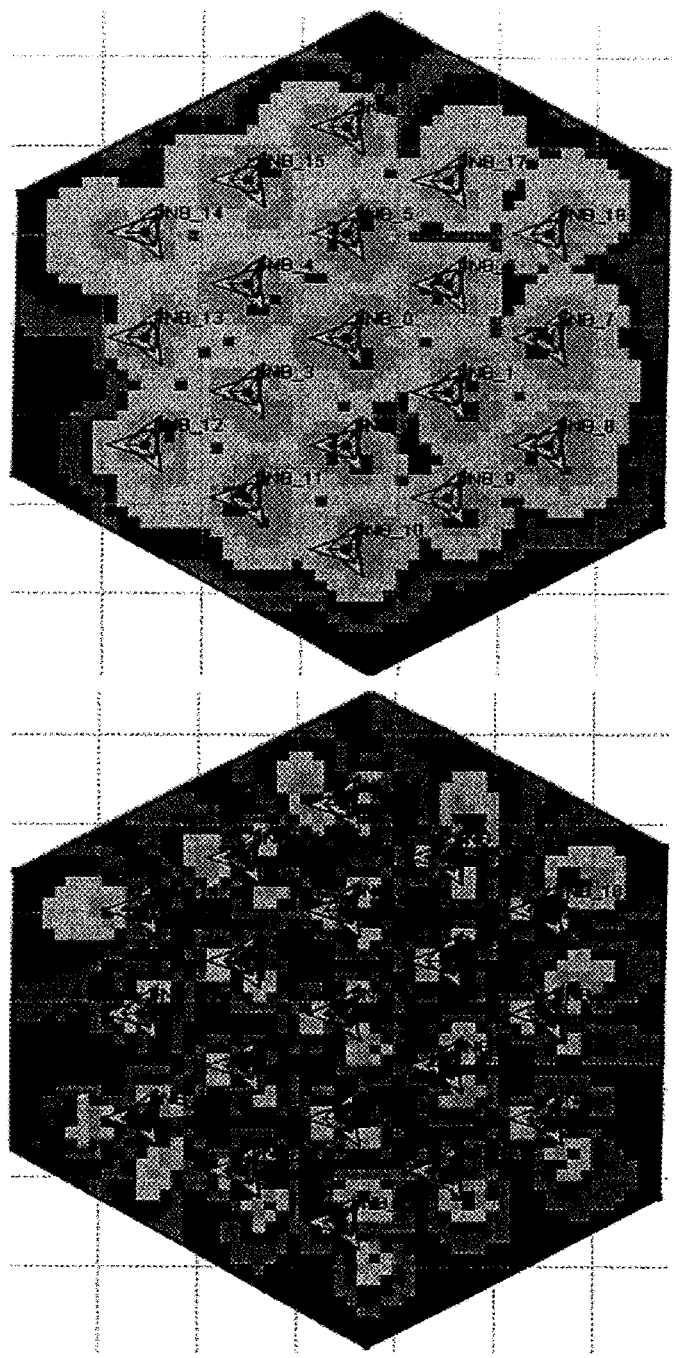
Figure 7E:
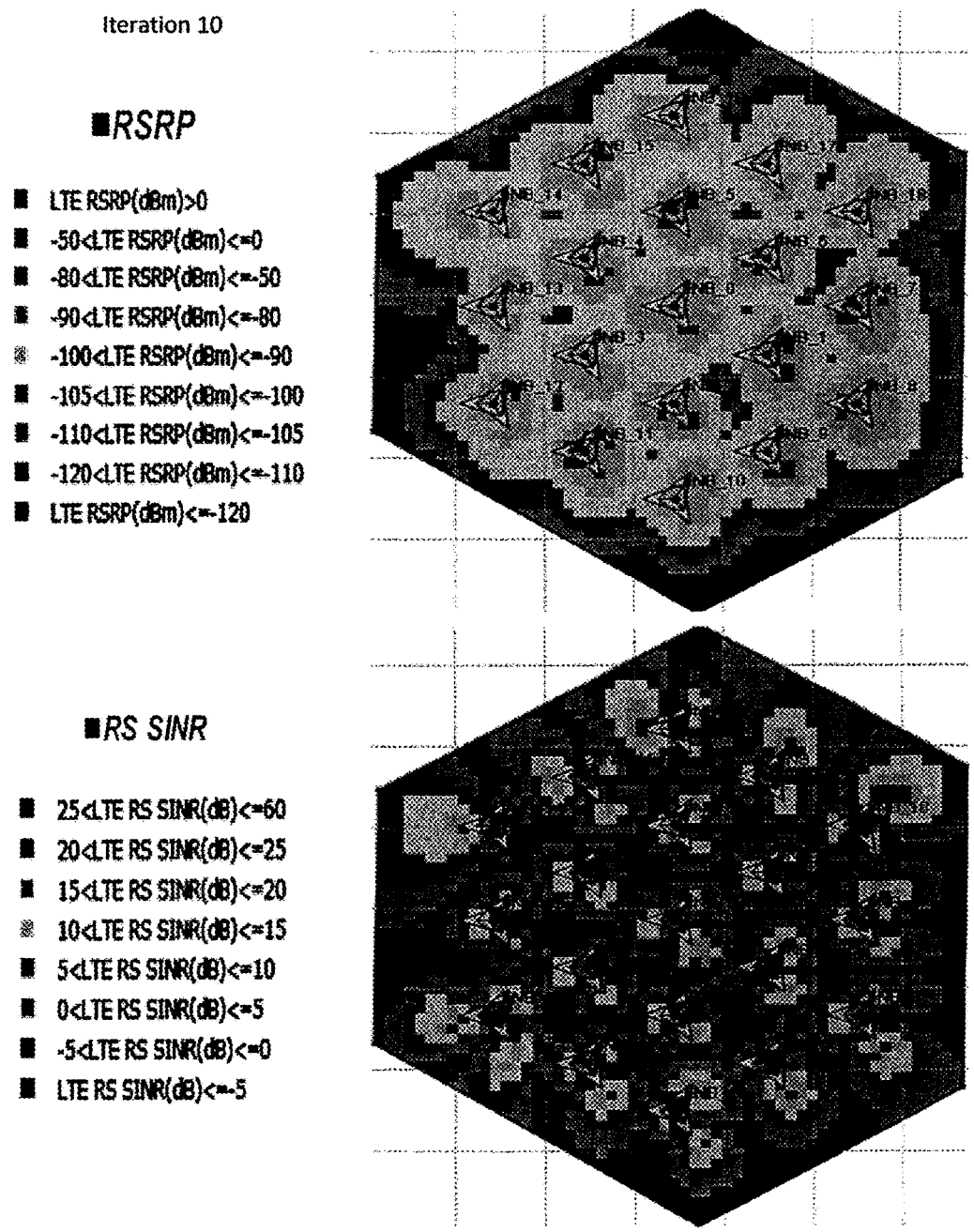

FIG. 6 shows a graph 600 of how the antenna configuration parameters of power and downtilt affect network performance (as measured by the objective function). The goal of process 200 is to identify a desired optimum network performance level 608 from a starting point 602. Process 200 is not aware of the particular starting point 602. Iterating through the base incremental adjustment phase 205 will attain a first intermediate network performance level 604. The biased random adjustment phase 209 will then kick in to perform chaotic jumps to identify the desired optimum network performance level 608, possibly through one or more second intermediate network performance levels 606.

FIGS. 7A-7E show the changes to the two parameters provided in the measurement reports through several iterations of the base incremental adjustment phase 205. The first measured parameter is RSRP. RSRP is a measure of signal strength and identifies the signal level of the Reference Signal transmitted by an eNB radio access node 102 and received by a UE device 104. RSRP is used by UE devices 104 for cell selection and reselection process and is reported to the network to aid in a handover procedure. RSRP is defined as the linear average over the power contributions of the resource elements that carry cell-specific reference signals within the considered measurement frequency bandwidth. The second measured parameter is RS-SINR. RS-SINR is a measure of signal quality and quantifies the relationship between RF conditions and throughput. UE devices 104 typically use RS-SINR to calculate a Channel Quality Indicator (CQI) reported to the network. RS-SINR indicates the power of measured usable signals, the power of measured signals or channel interference signals from other cells in the current system, and background noise related to measurement bandwidths and receiver noise coefficients. Though the present disclosure focuses on RSRP and RS-SINR, there are other parameters provided in the measurement reports that are used in operation of LTE network 100.

As shown in FIGS. 7A-7E, as the eNB radio access nodes 102 iterate through the process and perform base incremental adjustments to the antenna configuration parameters, the measured parameters RSRP and RS-SINR improve through each successive iteration. At some point in the base incremental adjustment phase 205, a lack of growth in the objective function occurs and a degradation can start to occur in the performance characteristics. This lack of growth (and possible degradation) is referred to as an improvement limit. For example, between iteration 9 of FIG. 7D and iteration 10 of FIG. 7E, the RSRP and RS-SINR values begin to decrease in certain areas of LTE network 100.

Figure 8:
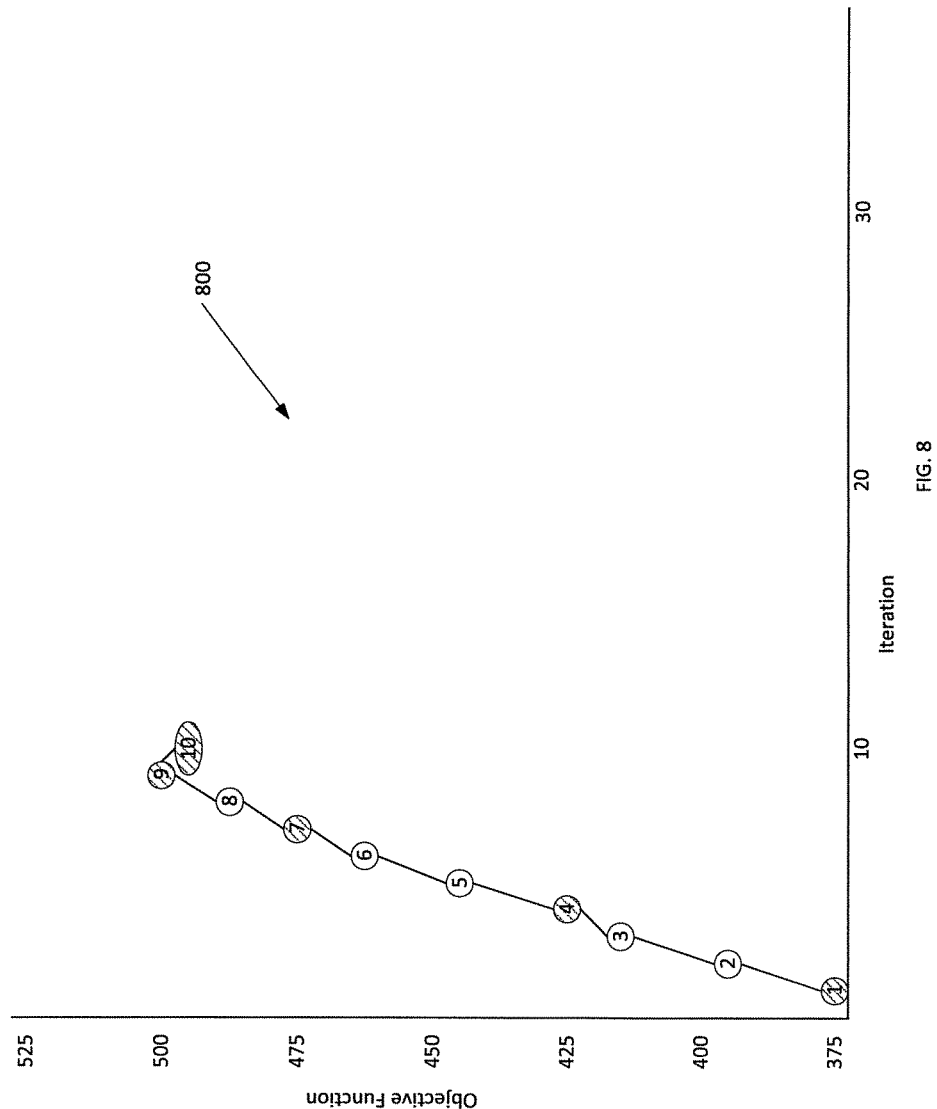
FIG. 8 illustrates a graph of an objective function through various iterations of the base incremental adjustment phase of the optimization process.

FIG. 8 shows a graph 800 depicting a change in the objective function through the iterations of the base incremental adjustment phase 205. Iteration numbers 1, 4, 7, 9, and 10 correspond to the results of the parameter adjustments shown in FIGS. 7A-7E. The base incremental adjustments rapidly improve performance within LTE network 100, as indicated by the rapid increase in objective function value. The trend in continued performance improvement continues up until a certain point. In complex, non-linear, and noise infused data environments such as provided by LTE network 100, base incremental adjustments to the antenna configuration parameters will reach an improvement limit where the objective function value does not increase (or increases only slightly) and may also provide improvement regression (e.g., a decrease in objective function value). Upon identifying a decrease in performance exceeding a desired threshold level, the base incremental adjustment phase 205 ends and the biased random adjustment phase 209 begins. In the example of FIG. 8, a decrease in performance represented by the objective function occurs between iteration 9 and iteration 10. Approximately at iteration 9 is where the improvement limit occurs.

Figure 9:
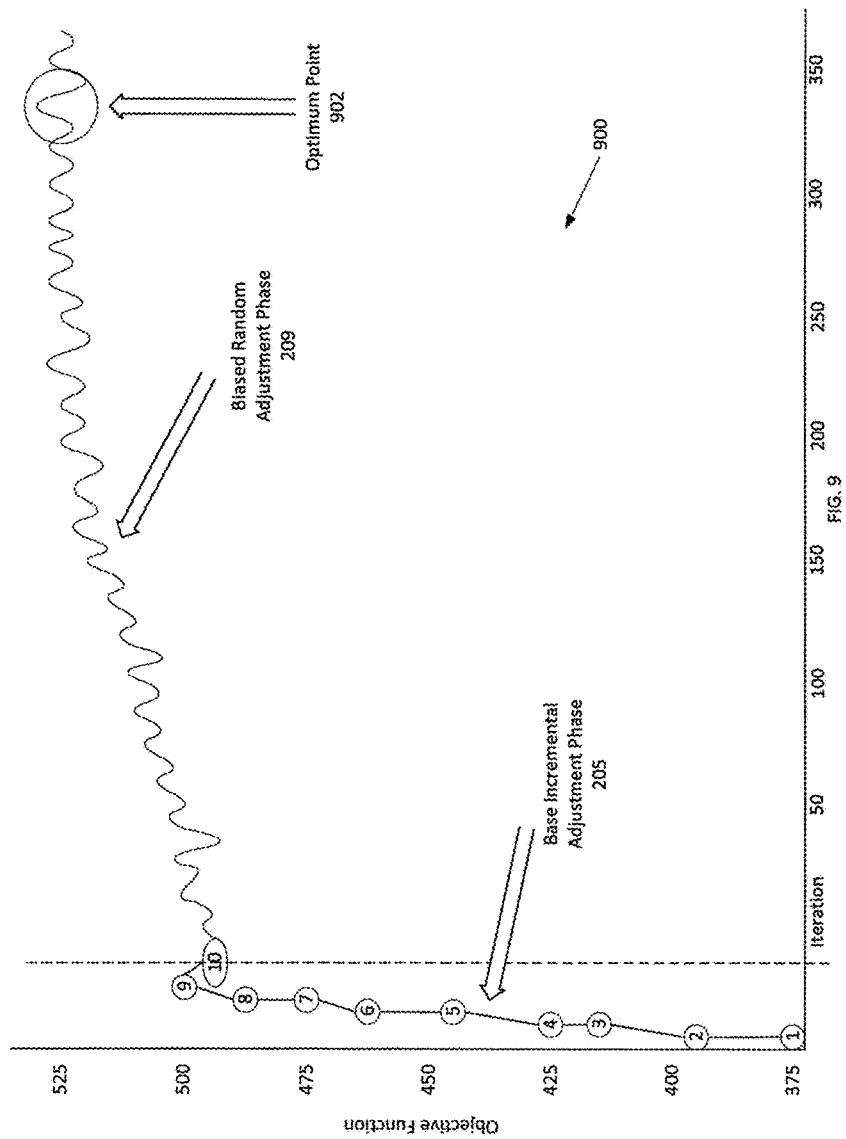
FIG. 9 illustrates a graph of the objective function through various iterations of a biased random adjustment phase of the optimization process.

FIG. 9 shows a graph 900 depicting a change in the objective function through the iterations of the biased random adjustment phase 209. As adjustments are accepted and discarded during the biased random adjustment phase 209, an upward drift in improvement in the objective function occurs subject to small oscillations along the way. The biased random adjustment phase 209 continues until an optimum point 902 is reached representing a global maximum, such as global maximum 504 of FIG. 5 or the desired optimum network performance level 608 of FIG. 6.

As described above, an analytics assisted fully automatic closed loop self-organizing network provides a general framework for solving large scale near real time network optimization problems (SON use cases) The optimization process disclosed herein learns the environment via real-time feedback of UE MRs and cell KPIs using machine learning analytics to assign actionable metrics/labels to cells. The optimizing process self-adapts internal algorithm parameters (like metric thresholds) to changing circumstances (data) and learns the correct action rule for a given cell in a given state. Domain expertise and sophisticated processes (explorative and learning based optimization) are combined in phases for deciding joint corrective actions. This approach contrasts to other approaches that use ad hoc engineering knowledge based rules and unreliable models. The optimization process is robust to engineering parameter database errors and lack of knowledge of UE locations and has minimal modeling assumptions in contrast to expensive and unreliable UE location based optimization techniques.

The optimization process is self-driving in that it uses machine learned cell labels or blame metrics with engineering knowledge guided small step actions to extract quick initial gains in network performance. For further optimization, action is taken in a biased random manner that balances reward with exploration risk. The optimization process learns from mistakes or wrong decisions with time to eventually pick a best action for a given cell state. As a result, the overall process is fast and outperforms engineers fazed by multi-cellular complex interactions. The optimization process provides a cost effective solution by reducing the need for an army of optimization engineers and expensive drive testing and model calibration. The optimization process may be readily extended to optimize additional CCO parameters like channel power offsets and CCO & Load Balancing (CCO+LB) scenarios. The optimization process works for diverse scenarios, including adapting to changes in the cellular network and traffic, and is readily transferable and scalable to other communication domains and deployments.

Determining Cell States to Adjust Antenna Configuration Parameters

The process for optimizing cell specific antenna configuration parameters described above can use various cell states to perform base incremental adjustments. Discussed below are embodiments for determining such cell states according to this disclosure.

Figure 10:
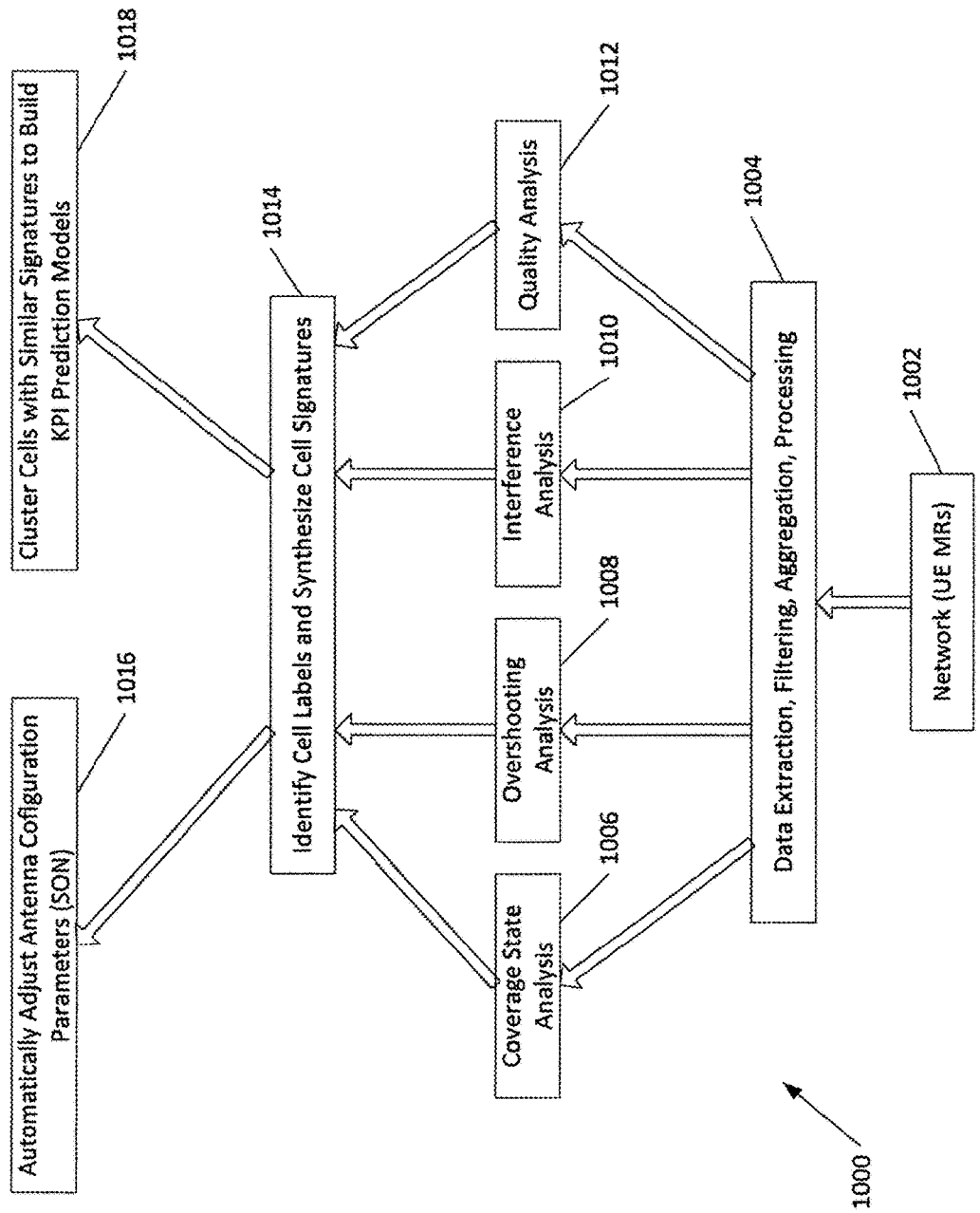
FIG. 10 illustrates an example process for determining cell states to adjust antenna configuration parameters.

FIG. 10 shows a process 1000 for determining cell states to adjust antenna configuration parameters. Process 1000 begins at block 1002 where MRs are received over the network from UE devices 104. As described above, the MRs can include multiple UE-related and cell-related parameters, such as cell ID, reference signal received power (RSRP), reference signal received quality (RSRQ), serving cell ID, and timing advance parameters. Data extraction, filtering aggregation, and processing are performed on the MRs at block 1004 to obtain values associated with network performance. Values analyzed for network performance include reference signal strength values such as RSRP used in LTE network 100, reference signal quality values, such as Reference Signal Signal-To-Interference-Noise Ratio (RS-SINR) or RSRQ for LTE network 100 may also be included in the analysis effort.

Though discussed in terms of a LTE network 100, process 1000 may be implemented in other network types including a Universal Mobile Telecommunications System (UMTS) network. The reference signal strength values in a UMTS network can include a Received Signal Code Power (RSCP) or Energy per Chip and Interference Level (Echo). Other values derived from the MRs may also be used in the cell state determinations. Though MR information and especially periodic MR information offer the best sampling of the network, other sources of network data may be used including, but not limited to, channel quality indicator (CQI), key performance indicators (KPI), Performance Monitoring (PM) counters, and key quality indicator (KQI) metrics.

The values derived from MRs transmitted by UE devices 104 are used to perform several cell state determinations for each cell in the network. A coverage state analysis is performed at block 1006 to determine whether the cell provides good or weak coverage. An example of such a coverage state analysis is described in detail below with respect to FIGS. 11-13B. An overshooting analysis is performed at block 1008 to determine whether the cell is an overshooter or a non-overshooter. An example of such an overshooting analysis is described in detail below with respect to FIGS. 14-17. An interference analysis is performed at block 1010 to determine whether the cell is an interferer or non-interferer. An example of such an interference analysis is described in detail below with respect to FIGS. 18 and 19. A quality analysis is performed at block 1012 to determine whether the cell is of good or bad quality. An example of such a quality analysis is described in detail below with respect to FIGS. 20 and 21. At block 1014, cell labels are identified from the cell state determinations and each cell synthesized by combining the set of cell state labels assigned to the cell to create a cell signature.

The cell signature (i.e., the combination of cell labels) for each cell may be used in block 1016 to automatically perform adjustments to the antenna configuration parameters in order to optimize for coverage, quality, and capacity, making use of domain knowledge for actions. For example, a network component may instruct a cluster of cells to adjust their cell configuration parameters (e.g., their antenna tilts, transmit power, or both) based on the cell signature assigned to each cell. As a particular example, if a cell is labeled as "good" coverage and "bad" quality, the transmit power of the cell may be increased. In another example, if a cell is labeled as "good" coverage and "strong" interference, the antenna tilt and/or transmit power of the cell may be decreased. In some embodiments, a combination of labels assigned to each cell and the current antenna tilt and/or RS power level of each corresponding cell are used to determine cell configuration adjustment. In the example where the cell is labeled as "good" coverage and "strong" interference, if the current antenna tilt level of the cell is "small", then the antennal tilt of the cell may be decreased by a small amount, which is a pre-defined level of antenna tilt amount. In some embodiments, the network component may map a combination of the status labels assigned to a cell and the current antenna tilt and/or RS power levels of the cell to an action and assign the action to the cell. An action represents a change of one or more of a cell's configuration parameters, such as increase or decrease of the antenna tilt and/or RS power of the cell. An action may be assigned based on domain knowledge, experience or expertise in consideration of status labels assigned to a cell, current configuration of the cell, and other factors that may affect its cell status.

In some embodiments, instead of a network component controlling automatic adjustments, the adjustments may be performed semi-automatically by providing the cell signatures to field optimization engineers to guide them in making adjustments to the antenna configuration parameters in the correct direction.

In addition, cells with similar signatures may be clustered in block 1018 to build KPI models for predictive analysis. In general, KPI predictive models are algorithms that identify which KPIs are likely to be a root cause of a poor key quality indicator (KQI), such as packet loss rate. For example, in the context of Coverage Capacity Optimization (CCO), antenna uptilt may be increased when a poor KQI is associated with an RSRP level, as that would indicate the root cause is poor coverage, while antenna downtilt may be increased when a poor KQI is associated with interference, as that would indicate the root cause is poor coverage. KPI predictive models for groups of similar cells can predict network performance given predictors such as traffic and resource consumption variables. KPI predictive models may also predict gains/losses due to the application of a new feature on a given type or group of cells. KPI predictive models are built based on actual historic/field trial data and have demonstrated value for use in feature recommendations, analysis, and improvement. Additional information regarding KPI predictive models can be found in commonly-owned U.S. patent application Ser. No. 14/810,699 filed Jul. 28, 2015, the contents of which are incorporated herein by reference. Cell labels and signatures generated from MRs transmitted by UE devices 104 offer a way of grouping like cells to pool data together in building more powerful predictive analytics models.

Figure 11:
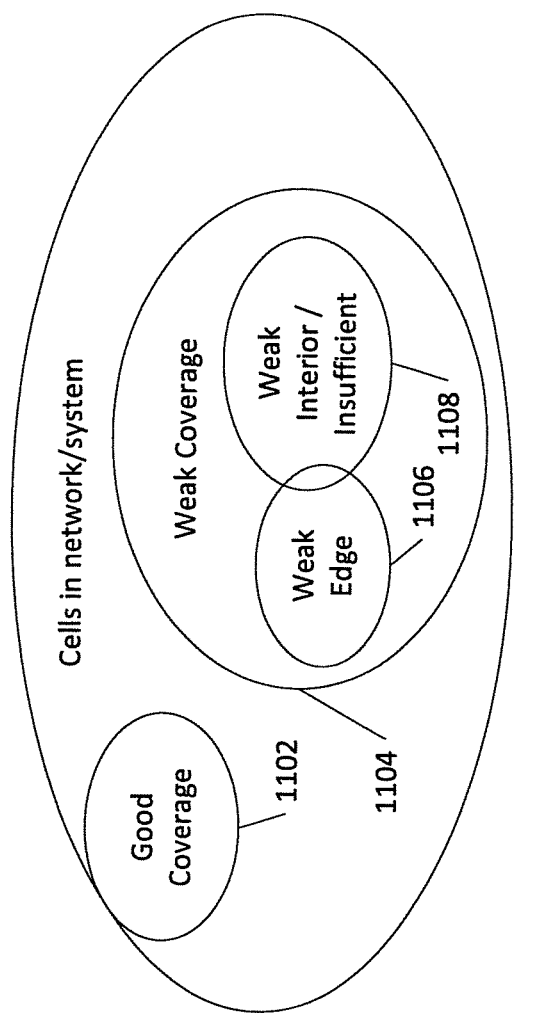
FIG. 11 illustrates the coverage states that can be assigned to a cell.

FIG. 11 shows the coverage states that can be assigned to a cell as determined in block 1006 of FIG. 10. A cell may have a state of good coverage 1102 or weak coverage 1104. If a cell is considered in a weak coverage state 1104, the cell may be further assigned a weak edge state 1106 or a weak interior/insufficient state 1108. A cell assigned a weak coverage state 1104 may also be assigned both a weak edge state 1106 and a weak interior/insufficient state 1108. In addition, it is possible that a cell assigned a weak coverage state 1104 may not be considered either in a weak edge state 1106 or a weak interior/insufficient state 1108. The assignment of a cell to a weak coverage state 1104, a weak edge state 1106, and/or a weak interior/insufficient state 1108 is based on RSRP values in MRs transmitted by UE devices 104. Of course, the coverage states 1102-1108 shown in FIG. 11 are merely one example. In other embodiments, there may be additional, intermediate coverage states. For example, there may be one or more additional weak coverage states based on ranges of RSRP values.

Figure 12:
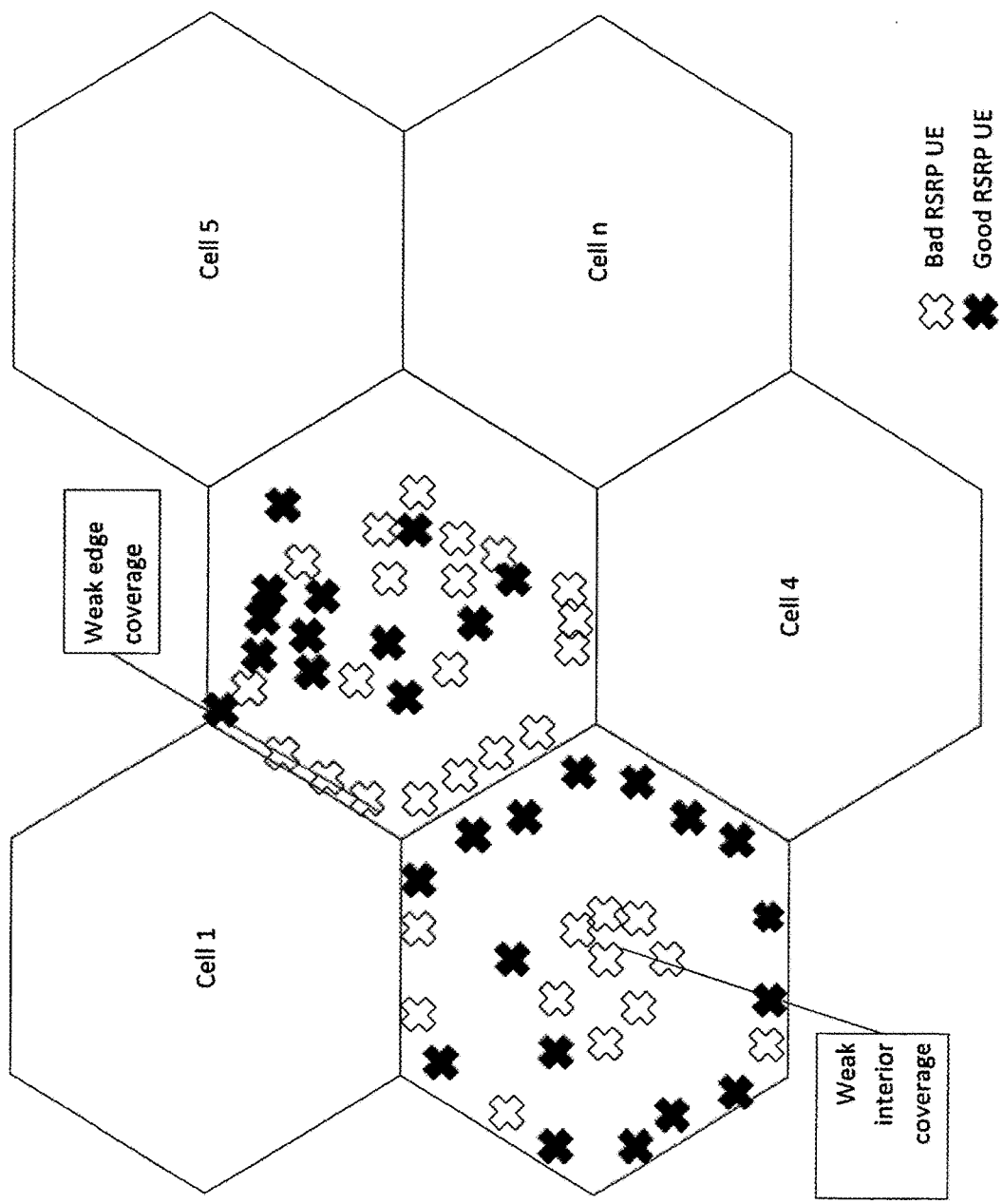
FIG. 12 illustrates additional coverage states of a weak edge state and a weak interior/insufficient state that can be assigned to a cell.

FIG. 12 shows an example of how a cell may be considered in a weak edge state 1106 and/or a weak interior/insufficient state 1108. A cell in a weak edge state 1106 has a certain number/percentage of UE devices 104 that it serves with corresponding RSRP values below a coverage threshold. In addition, a cell in weak edge state 1106 has a certain number/percentage of UE devices 104 that it serves with RSRP values associated with one or more neighboring cells within a coverage reference range of an average RSRP value for the cell. In this scenario, a UE device 104 with a low RSRP value corresponding to the best serving cell coupled with a high enough RSRP value associated with a neighboring cell is most likely located near the edge of coverage provided by the best serving cell.

To be considered in a weak interior/insufficient state 1108, the cell has a certain number/percentage of UE devices 104 that are served by the cell RSRP values below a coverage threshold. In addition, these UE devices 104 do not report a RSRP value associated with a neighboring cell that is within the coverage reference range. A UE device 104 with a low RSRP value for the best serving cell coupled with no significant RSRP value for a neighboring cell is most likely located near the interior of the cell.

Figure 13A:
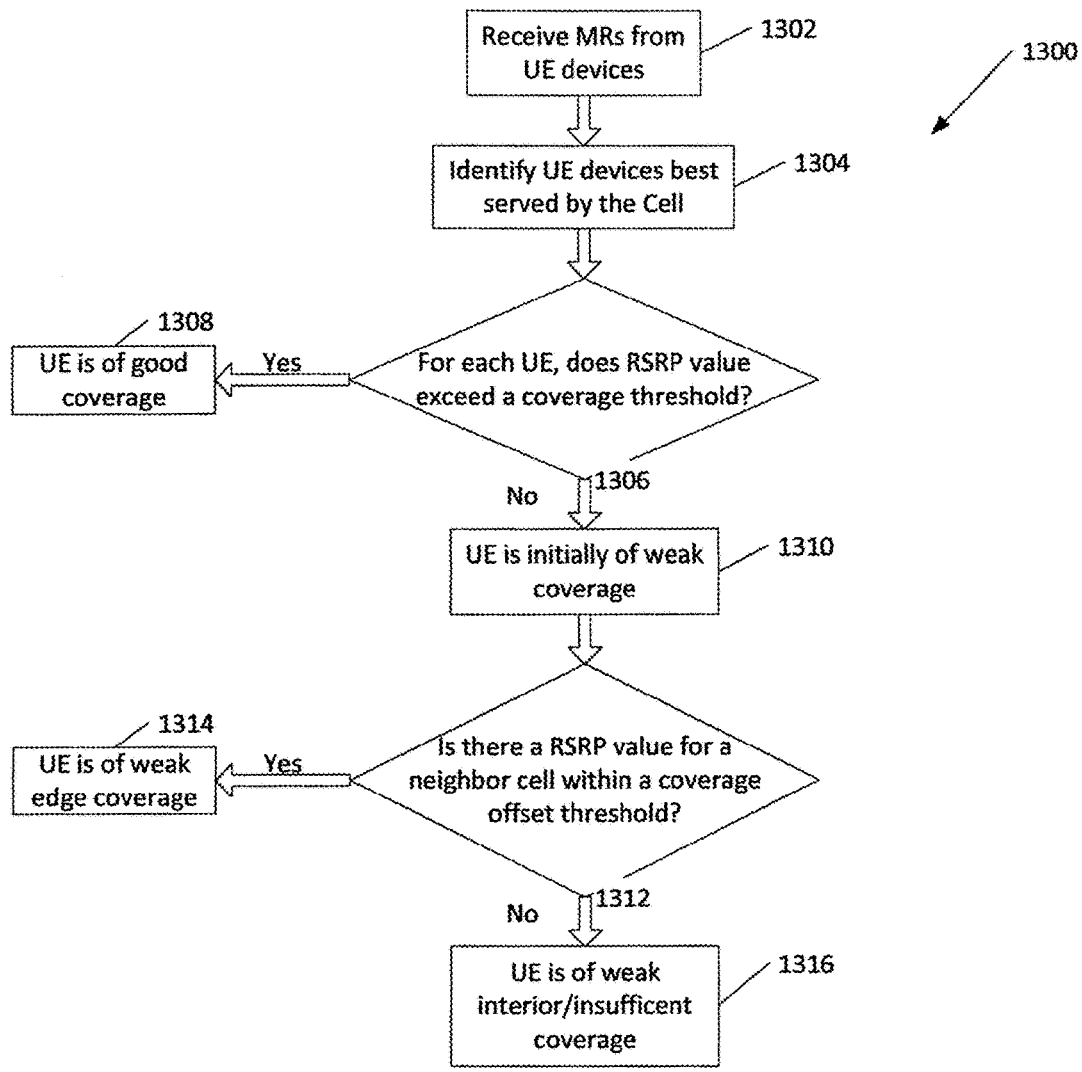
FIGS. 13A-13B illustrate a process for determining the coverage state for a cell.
Figure 13B:
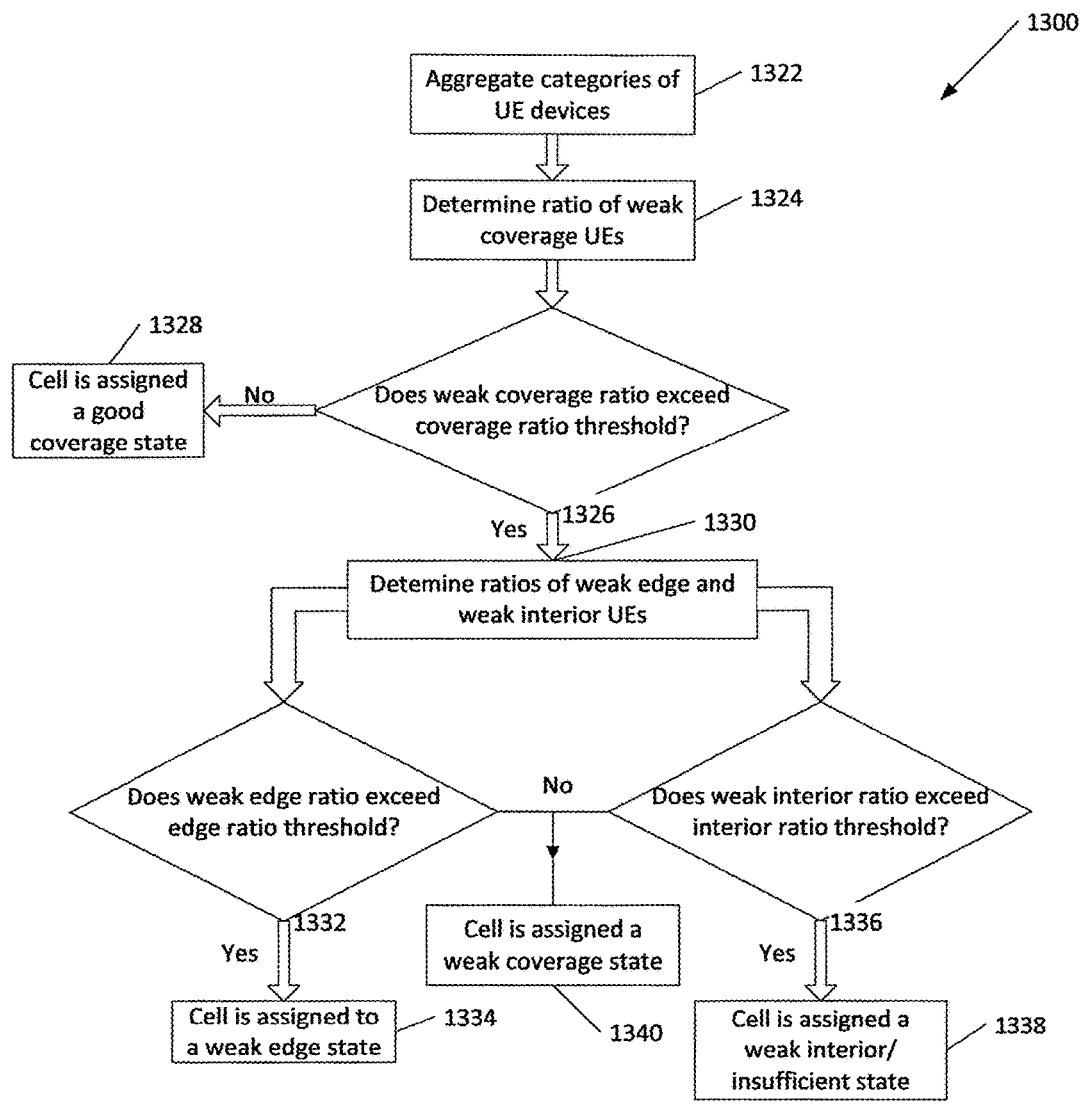

FIGS. 13A-13B show a process 1300 for determining a coverage state for a cell. In FIG. 13A, process 1300 first performs individual analysis of each UE device 104 best served by the cell and categorizes each UE device 104 as one of good coverage or weak coverage. Those UE devices 104 of weak coverage are further categorized as being of weak edge coverage or weak interior/insufficient coverage. In FIG. 13B, process 1300 then aggregates the categories of the UE devices 104, determines ratios of UE devices belonging to the cell with weak coverage, and compares the ratio to thresholds in order to assign a coverage state to the cell.

In FIG. 13A, process 1300 begins at block 1302 with the receipt of MRs from UE devices 104. From the MRs, those UE devices 104 best served by the cell are identified in block 1304. For each UE device 104, the RSRP value from the MR corresponding to the cell is compared to a coverage threshold value in block 1306. If this RSRP value exceeds the coverage threshold, the UE device 104 is assigned to a good coverage category at block 1308. If this RSRP value does not exceed the coverage threshold value, the UE device 104 is initially assigned to a weak coverage category at block 1310. At block 1312, the RSRP values associated with neighbor cells in the MR of the UE device are compared to a coverage offset threshold range. If at least one RSRP value associated with a neighbor cell is within the coverage offset threshold range, the UE device 104 is assigned to a weak edge category at block 1314. If there are no RSRP values associated with neighbor cells within the coverage offset threshold range, the UE device 104 is assigned to a weak interior/insufficient category at block 1316. Unlike a cell that can be assigned to either, both, or neither of a weak edge state and a weak interior/insufficient state, a UE device 104 of weak coverage is categorized as only one of weak edge or weak interior.

In FIG. 13B, process 1300 continues at block 1322 with the aggregation of the categories for the UE devices 104 determined in FIG. 13A. At block 1324, a ratio of weak coverage UEs is determined from the aggregation. The ratio of weak coverage UEs is compared to a coverage ratio threshold at block 1326. If the ratio of weak coverage UEs does not exceed a coverage ratio threshold, then the cell is assigned a good coverage state at block 1328. If the ratio of weak coverage UEs does exceed the coverage ratio threshold at block 1326, the ratios for weak edge UEs and weak interior/insufficient UEs are determined at block 1330. At block 1332, the ratio of weak edge UEs is compared to an edge ratio threshold. If the ratio of weak edge UEs exceeds the edge ratio threshold, then the cell is assigned to a weak edge state at block 1334. In addition, the ratio of weak interior/insufficient UEs is compared to an interior ratio threshold at block 1336. If the ratio of weak interior/insufficient UEs exceeds the interior ratio threshold, then the cell is assigned to a weak interior/insufficient state at block 1338. If neither the ratios of weak edge UEs nor weak interior/insufficient UEs exceed their respective ratio thresholds, the cell is assigned a weak coverage state in block 1340.

Figure 14:
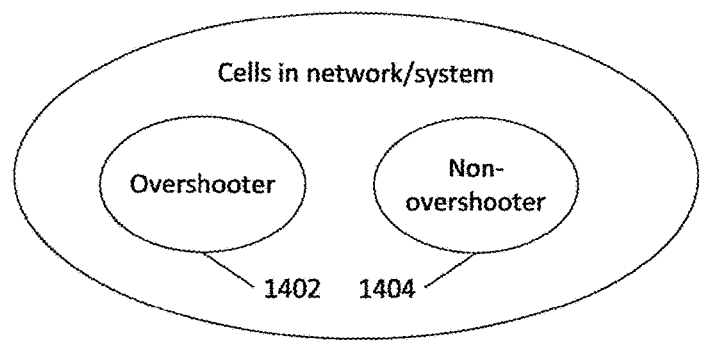
FIG. 14 illustrates the overshooting states that can be assigned to a cell.

FIG. 14 shows the overshooting states that can be assigned to a cell as determined in block 1008 of FIG. 10. A cell may be assigned an overshooter state 1402 or a non-overshooter state 1404. A cell may be considered to be in an overshooter state 1402 if its associated RSRP value in a MR of a UE device 104 served by a distant cell in another region ranks within a certain number of top RSRP values for the distant cell.

Figure 15:
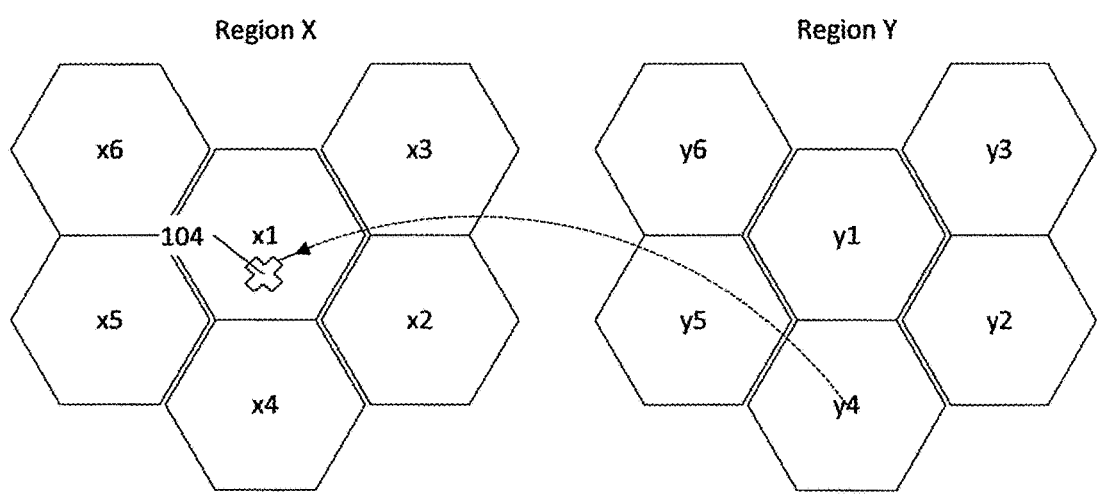
FIG. 15 illustrates an example of a cell in an overshooter state.

FIG. 15 shows an example of a cell in an overshooter state. UE device 104 located in and best served by cell x1 of Region X transmits a MR to eNB radio access node 102 providing coverage for cell x1. Note that the exact location of UE device 104 is unknown and does not need to be known. The parameter values in the MR transmitted by UE device 104 provide an indication that UE device 104 is served by cell x1 which is all that is needed for analysis purposes. The parameter values in the MR transmitted by UE device 104 may indicate a potential overshooter cell. In this example, cell y4 of Region Y may potentially be in an overshooter state. Cell y4 may be in an overshooter state if a RSRP value associated therewith is in a certain top number of reported RSRP values and/or within a certain threshold of the RSRP value corresponding to cell x1. For example, a MR report transmitted by UE device 104 in cell x1 includes multiple RSRP values associated with different cells. Table II shows a ranked list of the top six RSRP values reported by UE device 104 in its MR.

TABLE II

| RSRP Value Rank | Cell |
|---|---|
| 1 | x1 (overshootee) |
| 2 | x2 |
| 3 | x3 |
| 4 | y4 (overshooter) |
| 5 | x4 |
| 6 | x5 |

Cell y4, being in Region Y, is relatively far away from cell x1 as compared to the other cells in Region X. Typically, a cell that is relatively far away would not tend to be ranked near the top of the RSRP value list. Thus, it would be typical for cell y4 to be ranked much lower in Table II (e.g., at least below cells x4 and x5, which are much nearer to cell x1). By being in the top six of RSRP values for UE device 104, cell y4 is a potential overshooter. In addition, a UE device 104 is considered in an overlapped state if a pair of cells appears in the top k values of the RSRP value list determined from the transmitted MR and/or the difference between RSRP values is less than a certain threshold. An example threshold value is 3 dB, though any threshold value may be used as desired. Consideration of multiple overlapped UE devices 104 in an area or network is given to identify potential overshooters as overshooters or not overshooters, which will now be described.

Figure 16:
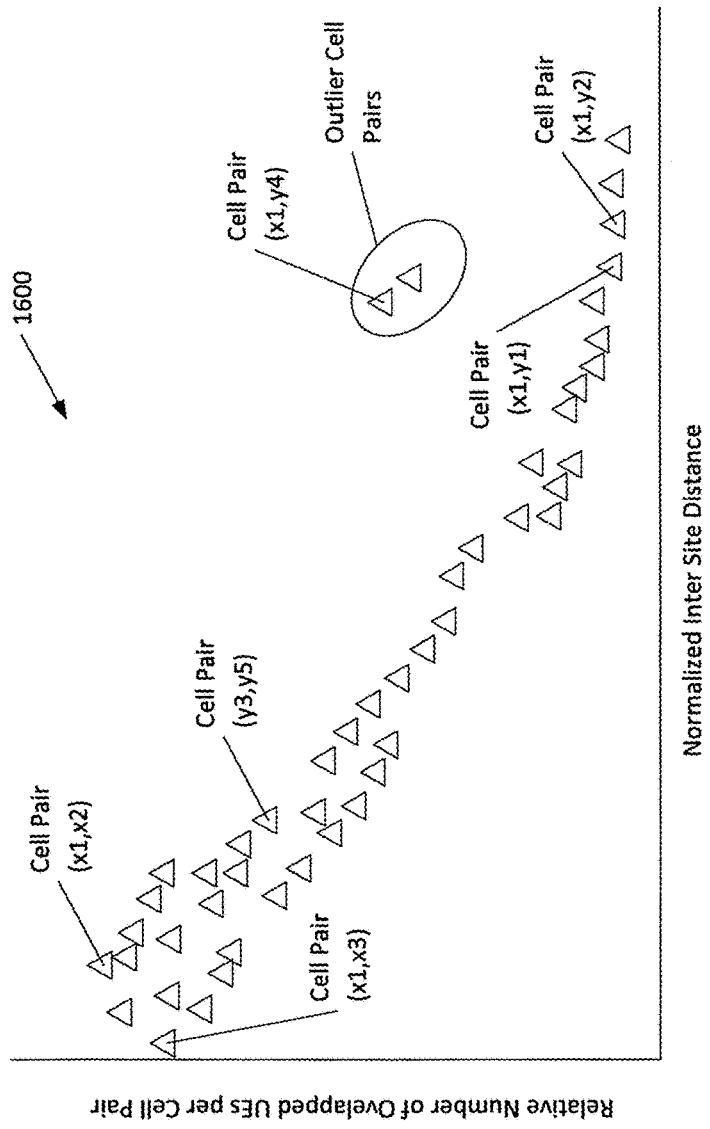
FIG. 16 illustrates a graph depicting a relationship between overlapped UE devices and overshooting identification.

FIG. 16 shows a graph 1600 depicting a relationship between overlapped UE devices 104 and overshooting identification. Each point in graph 1600 is a cell pair where the distance between cells in a cell pair increases along the y-axis. Ideally, a larger inter site distance between cells in a cell pair should lead to less overlapped UE devices 104 for the cell pair. Using the cell identifiers of FIG. 15, a relatively high number of overlapped UE devices 104 exist for cell pair x1,x2; cell pair x1,x3; and cell pair y3,y5, which is expected since there is a relatively short distance between the respective cells of each cell pair. A relatively low number of overlapped UE devices 104 exist for cell pair x1,y1 and cell pair x1,y2 as there is a relatively large distance between the cells of each cell pair.

Outlier cell pairs from the norm indicate an overshooter potential. The outlier cell pairs, such as cell pair x1,y4, have an abnormally high number of overlapped UE devices 104 as compared to cell pairs of a similar inter site distance. Identification of an outlier cell pair indicates that at least one cell in the cell pair may be in an overshooter state. Thus, cells x1 and y4 are both overshooter candidates; however, it is not clear just from looking at FIG. 16 if cell x1 is the overshooter and cell y4 is the overshootee, or if cell y4 is the overshooter and cell x1 is the overshootee. To determine the overshooter among the overshooter candidates, the ranked RSRP value lists such as shown in Table II are also considered. From Table II, it can be seen that cell y4 is a candidate for an overshooter state as its associated RSRP value is in an unexpected position in the RSRP value list of a UE device 104 being served by cell x1 in a different region than cell y4. However, an examination of a similar RSRP value list of a UE device 104 being served by cell y4 may reveal that cell x1 is not in an unexpected position in the RSRP value list. For example, cell x1 may rank below all of the cells y1-y6 and rank among the cells x1-x6, as would be expected if cell x1 is not an overshooter. Thus, by examining RSRP values lists for UE devices 104 served by cell x1 and UE devices 104 served by cell y4, it can be determined that cell y4 is an overshooter and cell x1 is not an overshooter.

Figure 17:
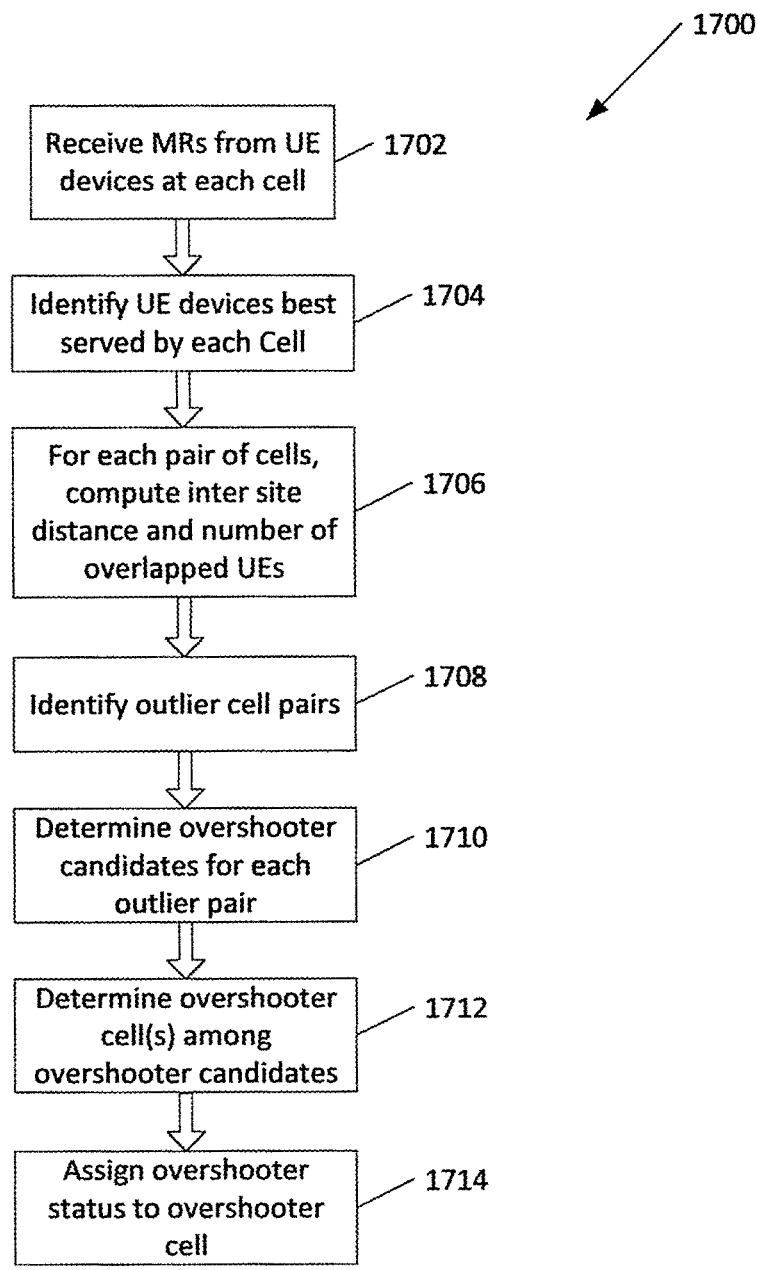
FIG. 17 shows a process for determining an overshooter state of a cell.

FIG. 17 shows a process for determining an overshooter state of a cell. Process 1700 begins at block 1702 with the receipt of MRs from UE devices 104 for each cell. From the MRs, those UE devices 104 best served by each cell are identified in block 1704. Cells are then paired up with every other cell at block 1706 and an inter site distance and number of overlapping UE devices are computed for each cell pair. Inter site distance may be normalized by the median inter site distance of a cell with its top neighbors. Normalization may be performed by dividing the inter site distance of a reference cell (such as x1) in the pair to its top n closest tier neighbor cells. Normalization is performed to standardize a picture across cells and create a global database of real world or well simulated examples. Outlier cell pairs are then identified in block 1708. An outlier cell pair may have an abnormal number of overlapping UE devices 104 in relation to the inter site distance between the cells in the cell pair. For each outlier pair, the overshooter candidate cells are determined at block 1710. Then, in block 1712, the overshooter(s) among the overshooter candidates are determined by examining ranked lists of RSRP values. For example, as described above, the overshooter cell will have its associated RSRP value near the top of the RSRP values of the other cell in the outlier cell pair. The overshooter state is assigned to the overshooter cell in block 1714.

In accordance with another embodiment, an algorithm for determining an overshooter state will now be described. The algorithm uses quantities termed N( ), Serving_Radius( ) and Planned_Radius( ), which are defined as follows.

N(s) is the set of all neighbor cells in an "estimated" neighbor list of a given serving cell s. The set N(s) can be inferred or estimated (either making use of cell azimuth information or without it) based on information extracted from one or more MRs. At a later point in the algorithm, N(s) can also be used to calculate a feature normalization factor, which is the sum of all MRs served by cell s and its neighbors.

Serving_Radius(s,o) maps one or more topology parameters involving a pair of cells (serving cell s and neighbor cell o) to a radius of serving cell s in the direction of cell o.

Planned_Radius(s) of a cell s is the average or median of Serving_Radius(s,o) over a predetermined most-related subset of cells o in the neighbor list of s, i.e., all o in N(s).

The algorithm performs overshooter detection as follows. In one or more cell-level variables for cell c, a counter for the algorithm counts the following values:

(1) The number of MRs served by a cell c with bad serving cell RSRQ (e.g., worse than T3 dB) and with no other significant overlapping cells (i.e., RSRPs in the MR list that are within T2 dB of the serving cell) that are "far away," as determined by the TA distance from c. Here, T3 is a predetermined RSRQ threshold separating good RSRQ of an MR (for the serving cell) from bad RSRQ and may be in a range of, e.g., [−20,0]. T2 is a predetermined RSRP offset to determine whether a pair of cells have significant overlap in an MR and may be in a range of, e.g., [9, 20]. TA distance is a parameter that is found in the MR and represents an estimated distance of a UE device that submits the MR from its serving cell.

(2) The number of MRs served by cell c with bad serving cell RSRQ (e.g., worse than T3 dB) and other significant overlapping cells present that are "far away" in terms of TA distance from c and such that the number of significant "far away" non-neighbor overlapping cells form a significant fraction (e.g., larger than Tn threshold) of the total number of overlapping cells. Here, Tn represents a threshold of a proportion of neighbors to the total number of cells seen in an MR for overshooter detection. As this is a ratio of small integers, only certain quantized values (e.g., between 0 and 1) make sense as threshold choices.

(3) The number of MRs not served by cell c with bad serving cell RSRQ (e.g., worse than T3 dB) and in which cell c is a significant overlapper and also a "far away" non-neighbor of the serving cell (that itself has been judged to be "not far away" from the MR).

This counter is then normalized with a blame normalization factor of c (i.e., the number of MRs served by c and all of its neighbors) and compared with a threshold Tos. Here, Tos is a predetermined threshold and may be between 0 and 1.

The cell c is declared an overshooter if the normalized overshoot counter of cell c exceeds Tos AND the fraction of MRs served by cell c with respect to an analysis cluster average per cell exceeds Tosormintraf. Here, Tosormintraf is a predetermined threshold that represents a minimum fraction of traffic (i.e., served MRs of a cell/analysis cluster average of MRs per cell) that a cell must carry before it is eligible to be declared as an overshooter. This latter condition on cell c's traffic is for stable statistical inference purpose. It is noted that the "far away" judgment above for an MR is based on its TA distance ratio (with respect to the serving cell's planned radius) exceeding Factor1Upper. Here, Factor1Upper represents a predetermined threshold to compare the ratio of the TA based distance of MR to a planned radius of the serving cell and decide whether MR is far away.

Normalization of the counters using the total traffic (served MRs) of the serving cell s and its estimated neighbors N(s) is important to ensure the setting of standard thresholds invariant to traffic or the specific set of cells being analyzed.

Thresholds used for overshooting, such as Tos, can be learned by offline analysis of real field trial or market data. If labeled examples (by domain expert engineers) of overshooters are used to guide threshold setting, it is called supervised learning; otherwise it is called unsupervised learning (that looks at the groupings of the metrics and outliers to determine thresholds). Similarly, if automatic algorithms learn the thresholds, it is called machine learning.

Figure 18:
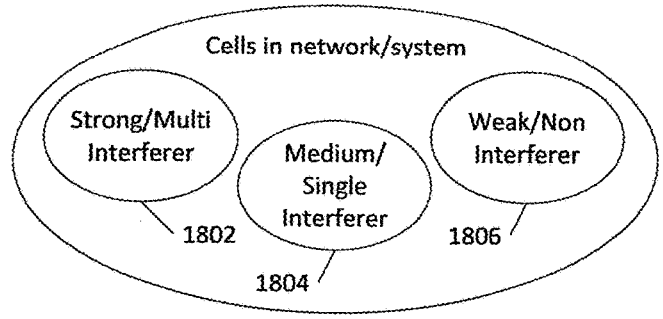
FIG. 18 shows the interference states that can be assigned to a cell.

FIG. 18 shows the interference states that can be assigned to a cell as determined in block 1010 of FIG. 10. As shown in FIG. 18, a cell may be considered as being a strong/multi-interferer 1802, a medium/single-interferer 1804, or a weak/non-interferer 1806. Of course, this is merely one example. In other embodiments, there may be additional, intermediate interferer states between strong/multi-interferer 1802 and weak/non-interferer 1806 that represent differing levels of interference. A first cell may be an interfering cell to a second cell if a RSRP associated with the first cell in a MR of a UE device 104 best served by the second cell is within a threshold range of an average RSRP reported by UE devices 104 best served by the second cell.

Figure 19:
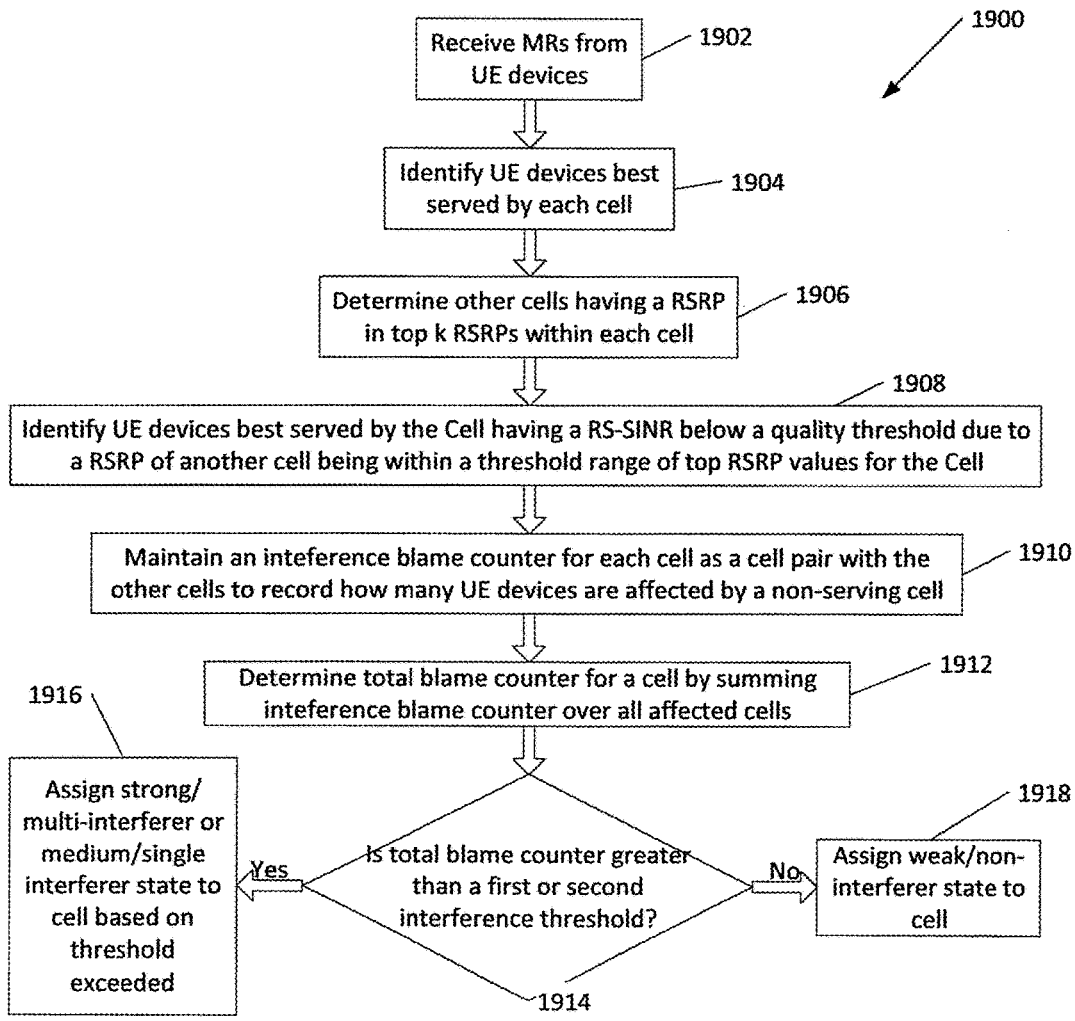
FIG. 19 shows a process for determining an interferer state of a cell.

FIG. 19 shows a process for determining an interferer state of a cell. Process 1900 begins at block 1902 with the receipt of MRs from UE devices 104 for each cell. From the MRs, those UE devices 104 best served by each cell are identified in block 1904. At block 1906, a determination is made in each cell if a RSRP associated with another cell is within a top k of RSRPs for the cell and/or within a reference range of an average RSRP in each cell. A cell having a RSRP within a top k of RSRPs for another cell may be an interferer to that cell. In block 1908, UE devices 104 best served by each cell as having a RS-SINR below a quality threshold due to a RSRP of another cell being within a threshold range of top RSRP values for the cell are identified. An interference blame counter is maintained in block 1910 for each cell as a cell pair with the other cells to record how many UE devices 104 are affected by a non-serving cell. A total blame counter for a cell is determined in block 1912 by summing interference blame counters over all affected cells. A check is made in block 1914 as to whether the total blame counter is greater than a first or second interference threshold. If the total blame counter is not greater than the first or second interference threshold, the cell is assigned a weak/non-interfering state at block 1916. If the total blame counter is greater than the first interference threshold but less than the second interference threshold, the cell is assigned a medium/single-interfering state at block 1918. If the total blame counter is greater than the second interference threshold, the cell is assigned a strong/multi-interferer state. The total blame counter may be normalized by the total number of UE devices 104 served by all cells in the neighborhood of the cell being assigned an interferer state.

The embodiment of FIG. 19 described above is based on consideration of one interference feature or metric, namely the number of UE devices having an RS-SINR below a quality threshold. This is merely one example. In other embodiments, other or additional interference features may be used in the analysis, including a number of cells a particular cell affects significantly in terms of a number or percentage of affected UE devices 104, or an average or median RSRP of a potential interferer cell MRs of UE devise 104 served by neighbor cells. In some embodiments, multiple interference features may be considered against multiple corresponding thresholds. If multiple interference features are considered (each with a corresponding threshold), a clustering algorithm such as shown in FIGS. 3A-3E may be used to analyze the multiple interference features concurrently.

Figure 20:
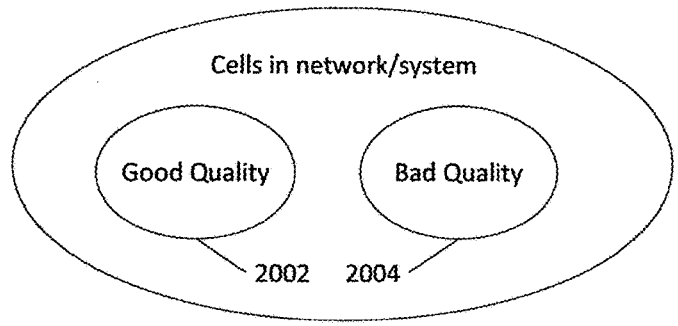
FIG. 20 shows the quality states that can be assigned to a cell.

FIG. 20 shows the quality states that can be assigned to a cell as determined in block 1012 of FIG. 10. A cell may be considered as being of good quality 2002 or bad quality 2004. A particular cell with a certain percentage of good quality UE devices 104 where the particular cell is the best server for the UE devices 104 is assigned a good quality state. A particular cell with less than a certain percentage of good quality UE devices 104 where the particular cell is the best server for the UE devices 104 is assigned a bad quality state. A good quality UE device 104 is one where the RS-SINR or RSRQ value is greater than a quality threshold value. The quality threshold may be fixed, dynamically adjusted, or learned in a supervised, semi-supervised, or unsupervised manner by correlating UE device 104 RS-SINR or RSRQ against relevant key performance indicators (KPI) and key quality indicators (KQI) describing a UE device 104 quality of experience (QoE). Of course, the quality states 2002-2004 shown in FIG. 20 are merely one example. In other embodiments, there may be one or more additional, intermediate quality states between good quality 2002 and bad quality 2004 based on intermediate thresholds of good quality UE devices 104.

Figure 21:
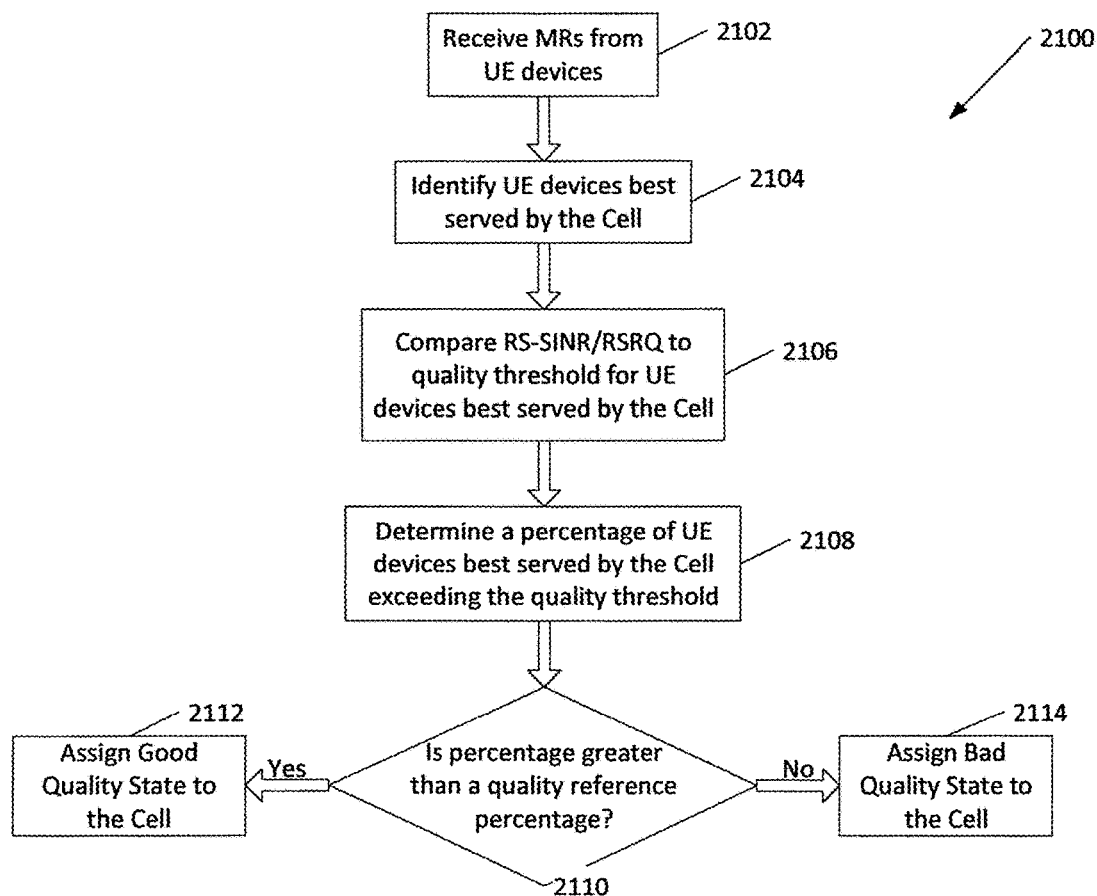
FIG. 21 shows a process for determining a quality state of a cell.

FIG. 21 shows a process 2100 for determining a quality state of a cell. Process 2100 begins at block 2102 with the receipt of MRs from UE devices 104. From the MRs, those UE devices 104 best served by the cell are identified in block 2104. For the UE devices 104 best served by the cell, the RS-SINR/RSRQ value from the MRs are compared to a quality threshold value at block 2106. A percentage of UE devices 104 best served by the cell that exceed the quality threshold value is determined at block 2108. At block 2110, the percentage of UE devices 104 exceeding the quality threshold value is compared to a quality reference percentage. If the percentage of UE devices 104 exceeding the quality threshold value is greater than the quality reference percentage, the cell is assigned a good quality state at block 2112. If the percentage of UE devices 104 exceeding the quality threshold value is not greater than the quality reference percentage, the cell is assigned a bad quality state at block 2114. The assignment of a good or bad quality state to the cell affects the adjustments to the antenna configuration parameters for the cell. The cell may be assigned a good or bad quality state in varying degrees based on how much the percentage is greater than or not greater than the quality reference percentage. Differing degrees of good and bad quality state may provide different adjustments to the antenna configuration parameters of the cell.

Figure 22:
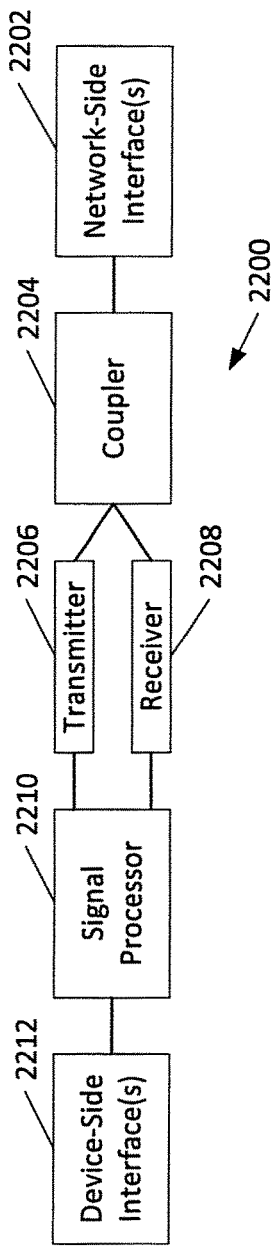
FIG. 22 illustrates a block diagram of an example processing system which may be implemented in the LTE network.

FIG. 22 shows a block diagram of a transceiver 2200 adapted to transmit and receive signaling over LIE network 100. One or more transceivers 2200 may be implemented in eNB radio access nodes 102 configured for adjusting cell specific antenna configuration parameters and/or determining cell states, as described in the embodiments herein. As shown, the transceiver 2200 comprises a network-side interface 2202, a coupler 2204, a transmitter 2206, a receiver 2208, a signal processor 2210, and a device-side interface 2212. The network-side interface 2202 may include any component or collection of components including antennas adapted to transmit or receive signaling over LTE network 100. The coupler 2204 may include any component or collection of components adapted to facilitate bi-directional communication over the network-side interface 2202. The transmitter 2206 may include any component or collection of components (e.g., up-converter, power amplifier, etc.) adapted to convert a baseband signal into a modulated carrier signal suitable for transmission over the network-side interface 2202. The receiver 2208 may include any component or collection of components (e.g., down-converter, low noise amplifier, etc.) adapted to convert a carrier signal received over the network-side interface 2202 into a baseband signal. The signal processor 2210 may include any component or collection of components adapted to convert a baseband signal into a data signal suitable for communication over the device-side interface(s) 2212, or vice-versa. The device-side interface(s) 2212 may include any component or collection of components adapted to communicate data-signals between the signal processor 2210 and components within the host device (e.g., UE devices 104, local area network (LAN) ports, etc.).

The transceiver 2200 may transmit and receive signaling over any type of communications medium. In some embodiments, the transceiver 2200 transmits and receives signaling over a wireless medium. For example, the transceiver 2200 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 2202 comprises one or more antenna/radiating elements. For example, the network-side interface 2202 may include a single antenna, multiple separate antennas, or a multi-antenna array configured for multi-layer communication, e.g., single input multiple output (SIMO), multiple input single output (MISO), multiple input multiple output (MIMO), etc. The configuration parameters of these antennas are adjusted based on the one or more states of the cell as determined above. In other embodiments, the transceiver 2200 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Figure 23:
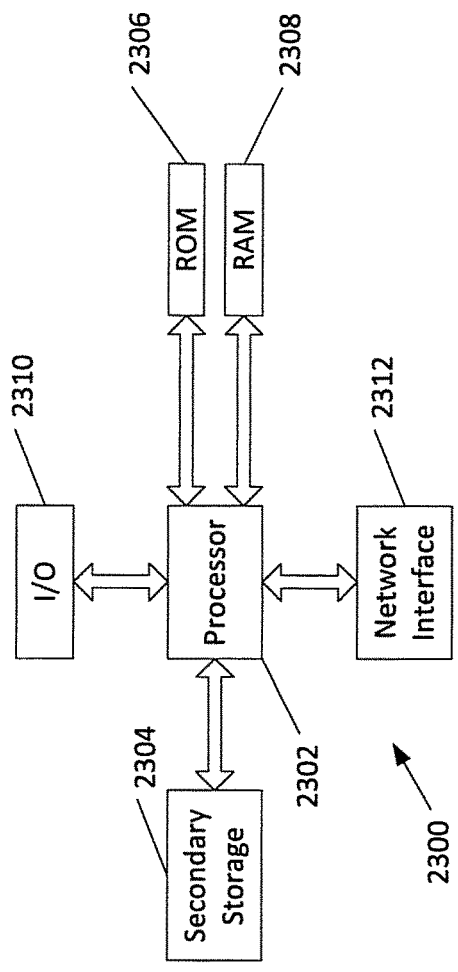
FIG. 23 illustrates a simplified example of a general-purpose computing component suitable for implementing one or more embodiments disclosed herein.

FIG. 23 illustrates a simplified example of a general-purpose computing component 2300 suitable for implementing one or more embodiments disclosed herein. Computing component 2300 may be incorporated at each cell to determine the one or more states of the cell as discussed above. The features described above for adjusting cell specific antenna configuration parameters and/or determining cell states may be implemented on any general-purpose computing component, such as a computer or network component with sufficient processing power, memory resources, and network throughput capability to handle the necessary workload placed upon it. For example, computing component 2300 may be implemented in each eNB radio access node 102 or in a centralized server at the network level to perform the features described herein. The computing component 2300 includes a processor 2302 (which may be referred to as a central processor unit or CPU) that is in communication with memory devices including secondary storage 2304, read only memory (ROM) 2306, random access memory (RAM) 2308, input/output (I/O) devices 2310, and network/component connectivity devices 2312. The processor 2302 may be implemented as one or more CPU chips, or may be part of one or more application specific integrated circuits (ASICs).

The secondary storage 2304 is typically comprised of one or more disk drives or tape drives and is used for non-volatile storage of data and as an over-flow data storage device if RAM 2308 is not large enough to hold all working data. Secondary storage 2304 may be used to store programs that are loaded into RAM 2308 when such programs are selected for execution. The ROM 2306 is used to store instructions and perhaps data that are read during program execution. ROM 2306 is a non-volatile memory device that typically has a small memory capacity relative to the larger memory capacity of secondary storage 2304. The RAM 2308 is used to store volatile data and perhaps to store instructions. Access to both ROM 2306 and RAM 2308 is typically faster than to secondary storage 2304.

Solutions for Large Scale Near Real Time Network Optimization Problems

Embodiments of this disclosure provide a general approach for solving large scale near real time network optimization problems (e.g., SON use cases). Embodiments of this disclosure may divide large networks into subgroups of smaller networks, and then optimize control decisions for the subgroups using a simulated annealing technique. Simulated annealing (SA) is a generic probabilistic meta-heuristic approach for solving global optimization problems that locate a good approximation to the global optimum of a given function in a large search space. In an embodiment, a method may dynamically identify and/or sort problematic cells at the global or sub-group level, and optimize cells based on priority such that the more problematic cells are optimized first. In some embodiments, self learning solutions are executed online based real-time feedback (e.g., UE MRs, KPIs, mistakes, rewards). Self learning solutions may also be executed offline based on a simulation.

Embodiments of this disclosure may provide techniques for avoiding local optimization to obtain globally optimal, or near globally optimal, solutions. This can be achieved through simulated annealing (SA) based guided random search via online learning from experience with the system and proactive offline optimization via simulators, accepting worse solution according to some criterions (e.g., Metropolis), etc.

Embodiments of this disclosure provide autonomous, closed-loop, adaptive, self-learning techniques that are robust across different network implementations. Embodiment approaches may utilize minimal modeling assumptions, and may be insensitive to lack of UE location information and/or inaccurate engineering parameters.

Control parameters for the cluster of cells may be adapted using an embodiment autonomous adaptive simulated annealing algorithm. Aspects of this disclosure provide autonomous adaptive simulated annealing algorithms. An embodiment algorithm is described by the following ten steps.

The first step comprises obtaining an initial solution (S) and an initial temperature (T0). In one embodiment, the starting temperature (T0) is selected based on an objective or cost function during an offline simulation. In another embodiment, the starting temperature (T0) is selected by increasing the starting temperature (T0) until an acceptance ratio exceeds a threshold, e.g., ninety percent, etc.

The second step comprises evaluating the cost of the initial solution using constraints (e.g., thresholds and weights for parameters (e.g., RSRP, SINR) used in objective function). This may include a normalization process that considers the cost per cell, the ratio of total cost to the total number of UEs, and the ratio of cost to number of UEs per cell. The second step may also consider the cost per cell or per area (e.g., all cells or partial group of cells such as neighbors), cost percentage (e.g., ratio of cost per cell to UE number per cell), and distribution (e.g., weighted by cell).

The third step comprises generating a new solution (Snew). The new solution may be generated using various adaptive (e.g., on-line) algorithm algorithms, including a uniform algorithm, a guided random search (e.g., Gaussian, Cauchy). The new solution may also be generated via an offline simulation combined with reinforcement learning. Generating the new solution may include selecting which cell(s) are to be adjusted. The cells may be chosen randomly, using a heuristic approach, e.g., sorted by cost to UE no per cell, first m, exponential probability), or a using a hybrid approach (e.g., part random and part heuristic). The number of cells that are optimized may fixed (e.g., X number of cells), or adaptive (e.g., based on the priority or severity of problematic cells). One or more parameters may be adjusted per iteration. Various change/action/perturbation mechanisms may be applied to adjust the parameters to be adjusted. For example, parameters may be adjusted in the positive or negative direction. The adjustments can use different step size adjustment parameters, e.g., small step, large step, absolute step size, relative step size, fixed step-size/range, adaptive step-size/range depending on the temperature at system/cell level or offline simulation, etc.

The fourth step includes evaluating the cost of the new solution. The fifth step includes determining whether to select the new solution as the current solution. This decision may consider various criteria, and may be probability-based and/or threshold based. For example, the decision may consider criteria related to the cost of the new solution, e.g., difference between the cost of new solution and optimal cost, cost per UE or per cell, etc.

The sixth step determines whether an equilibrium condition (# of iterations carried out before update T) has not been reached. If not, then the technique reverts back to step three. The seventh step comprises learning from experience gained during the first six steps, e.g., feedback from the system, mistake, reward, etc. This step may update models and/or parameters, such as control parameters (e.g., system/cell level temperate Tn), propagation models used by simulators, engineering parameters, parameters/models for identifying problematic cells, generating new solution and accepting new solution, etc.

The eighth step determines whether a backward/safeguard condition has been met. If so, the technique back-steps to a previous solution according to some criteria. This step may be helpful in avoiding locally optimal solutions. The ninth step determines whether a termination criterion has been reached according to some criteria. If not, then the technique reverts back to step three. The tenth step returns all solutions and relevant parameters, e.g., Sbest, Cbest, S, C, Sall and Call.

Figure 24:
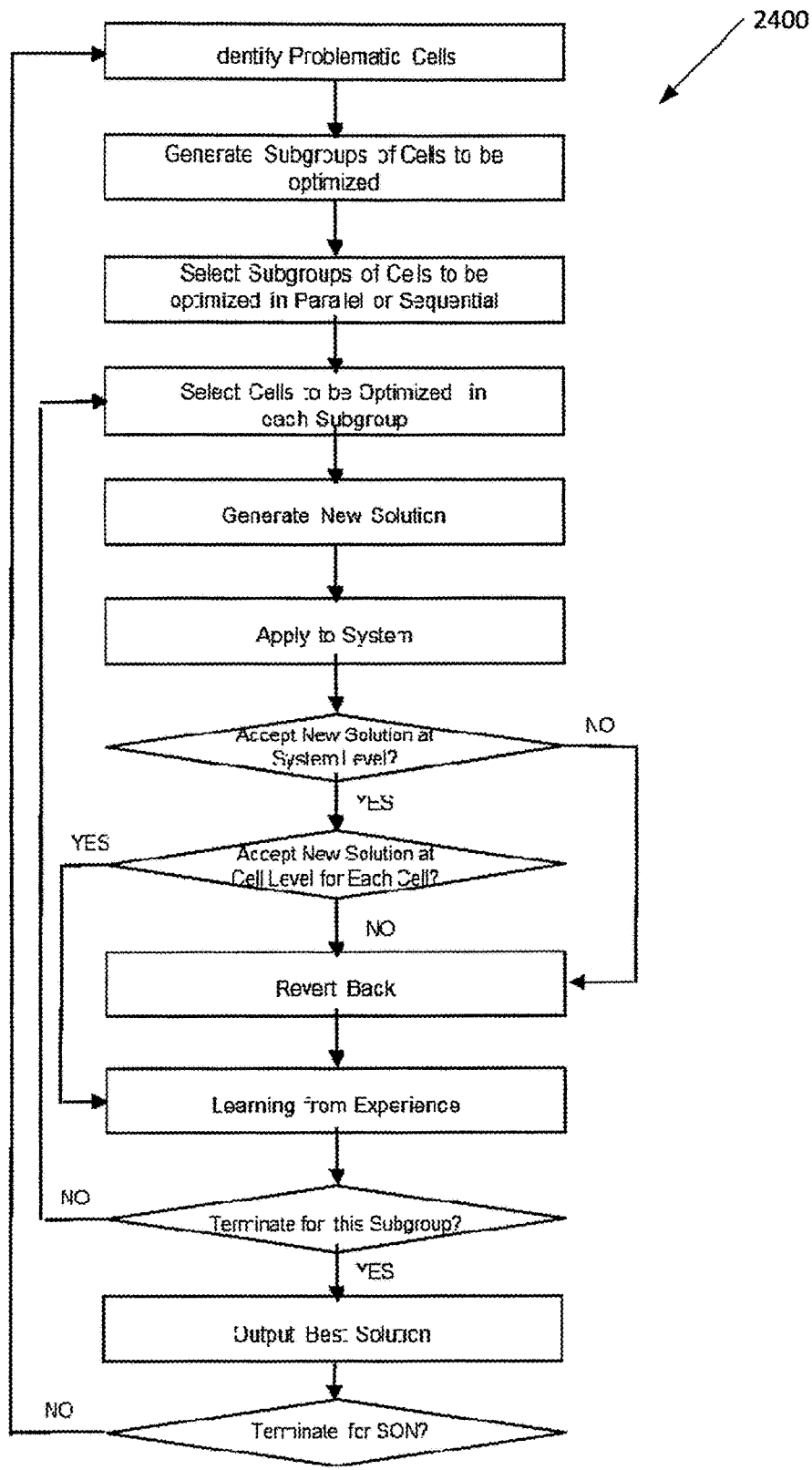
FIG. 24 illustrates a flowchart of an embodiment method for adjusting communication parameters for a cluster of cells using an autonomous adaptive simulated annealing algorithm.

FIG. 24 illustrates an embodiment flowchart for adjusting communication parameters for a cluster of cells using an autonomous adaptive simulated annealing algorithm. As shown, the method 2400 begins by identifying all problematic cells. Next, the method 2400 generates subgroups of cells to be optimized. Thereafter, the method 2400 selects subgroups of cells to be optimized in parallel and/or subgroups of cells to be optimized sequentially. Subsequently, the method 2400 selects cells to be optimized in each subgroup. Next, the method 2400 generates a new solution. Thereafter, the method 2400 determines whether or not to select the new solution at the system level.

If the new solution is selected at the system level, then the method 2400 determines whether or not to select the new solution at the cell level. If the new solution is selected at the system level, then the method 2400 proceeds to learn from its experience. When learning from the solution, the method 2400 may record the solution, and update the models/parameters. After learning from the experience, the method 2400 determines whether to terminate the subgroup. If the subgroup is terminated, then the method 2400 re-selects cells to be optimized in the subgroup. If the subgroup is not terminated, then the method 2400 outputs the best solution, and then determines whether to terminate the SON session. If the new system is rejected at the system level or at the cell level, then the method 2400 reverts back.

Figure 25:
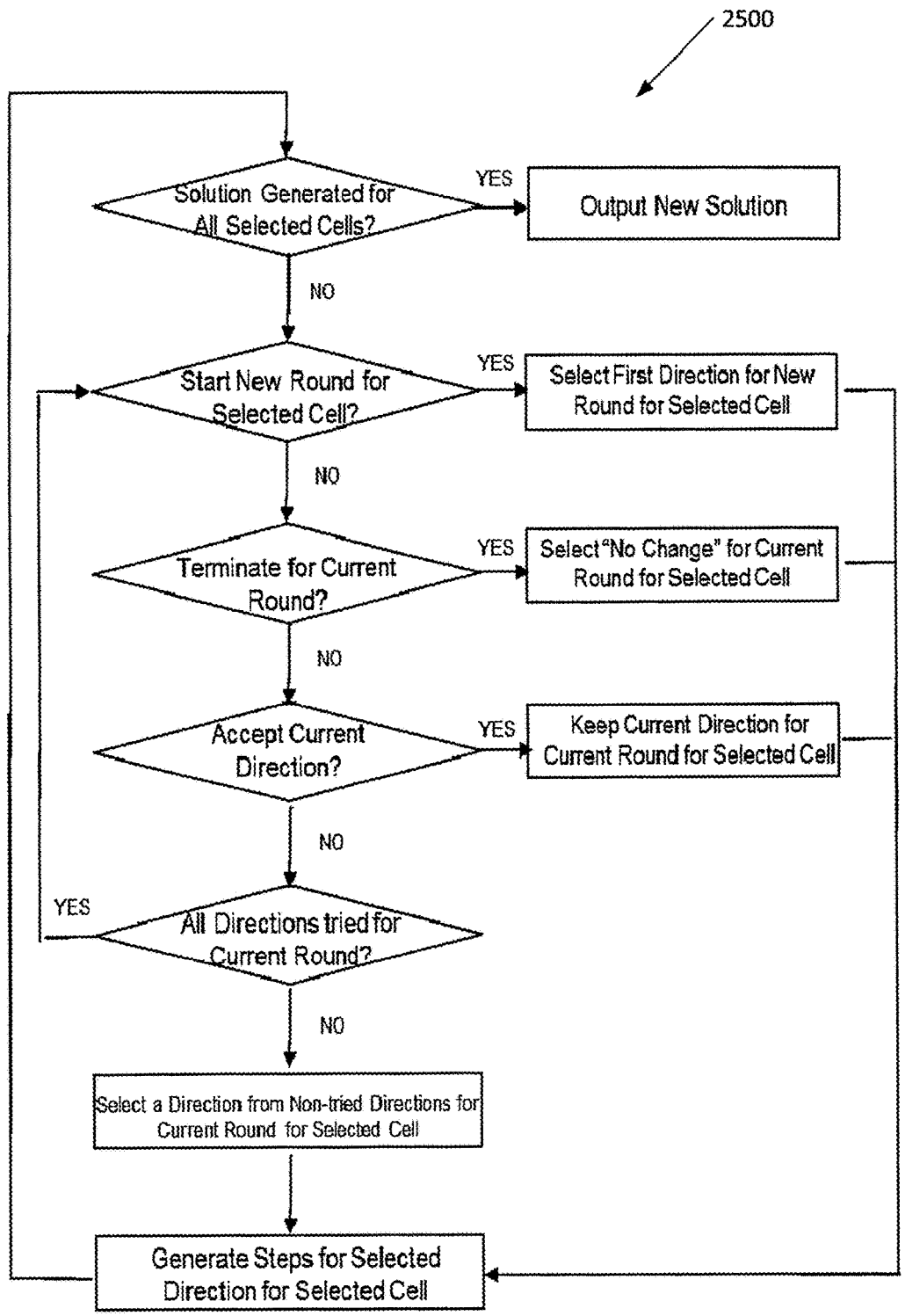
FIG. 25 illustrates a flowchart of an embodiment method for adjusting communication parameters for a subset of cells.

Aspects of this disclosure provide techniques for generating new solutions for selected cells during SA-based self learning. FIG. 25 illustrates an embodiment flowchart for generating new solutions for selected cells during SA-based self learning. As shown, the method 2500 begins by starting a new round of optimization for a selected cell. Various criteria may be used to determine when to start a new round of optimization. In some embodiments, groups of two or more cells may be optimized in parallel. In an embodiment, a new round of optimization may be started only after a certain number of cells in the group have finished the previous round of optimization. During the new round of optimization, a direction is selected for the cell. The possible directions may include randomly generated and/or pre-defined directions for RF parameters, e.g., electronic antenna tilt, power (up/0, down/0, 0/up, 0/down, 0/0), etc. The directions may be determined using adaptive online techniques, or via offline simulation. Various methods may be used to determine the direction, e.g., guided random, learning from experience (e.g., direction with maximum probability of positive gain), heuristic (e.g., expert system, whitebox), offline simulation (e.g., Netlab), predefined order of directions, adaptive (e.g., up-tilt if current eTilt<(max−min)/2), reinforcement learning, etc.

Thereafter, parameter(s) are adjusted based on a step size in the selected direction, after which a solution is generated. Next, the method 2500 determines whether to continue stepping in the current direction. If so, the parameters are adjusted once more in the selected direction, and a solution is generated. At some point, a determination is made to change the direction for the current cell, at which point parameters are adjusted in a different direction. Outputs are generated iteratively until a termination condition is reached, e.g., all directions have been considered, a threshold number of directions have been considered, etc. Thereafter, a new cell is selected, and directions for the new cell are evaluated to generate corresponding solutions. Cells in the selected subset are evaluated iteratively until another termination condition is reached, at which point a new solution is output. Termination conditions may occur after performance of a threshold number of iterations or rounds. Termination conditions may also include results-based criteria, e.g., negative gain, number of negative gains, number of rejections, etc.

FIG. 26 illustrates a graph of the results of simulations of the method 2500 described in FIG. 25. These results were obtained by starting a new round of adjustment without waiting for all cells to be adjusted in the previous round. Three rounds of adjustment were performed. FIG. 27 illustrates a graph of the results of simulations of the method 2500 described in FIG. 25. These results were obtained by starting a new round of adjustment only after all cells had been adjusted in the previous round.

Figure 28:
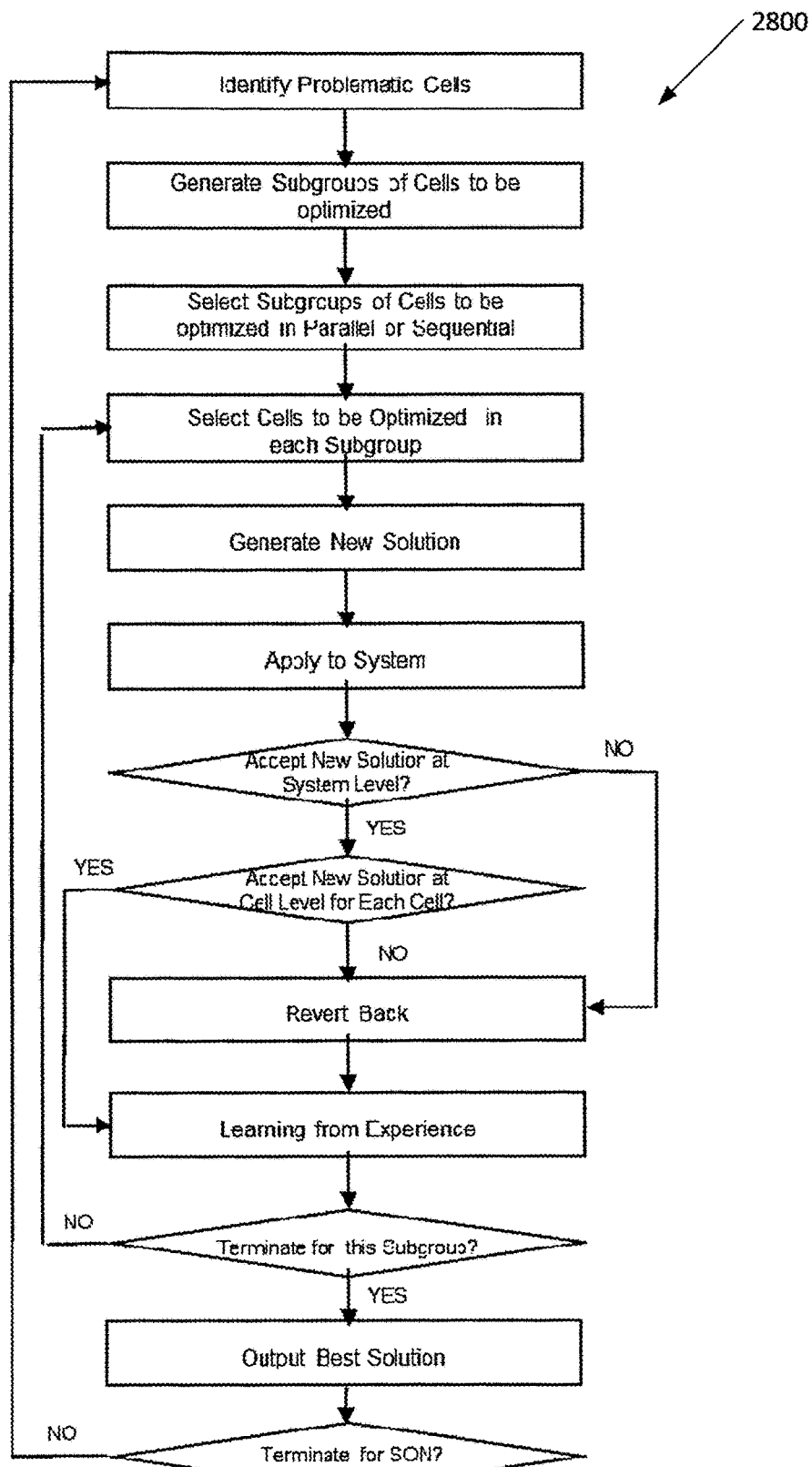
FIG. 28 illustrates an embodiment flowchart for adjusting communication parameters for a cluster of cells using an autonomous adaptive simulated annealing algorithm.

FIG. 28 illustrates an embodiment flowchart for adjusting communication parameters for a cluster of cells using an autonomous adaptive simulated annealing algorithm. As shown, the method 2800 begins by identifying all problematic cells. Next, the method 2800 generates subgroups of cells to be optimized. Thereafter, the method 2800 selects subgroups of cells to be optimized in parallel and/or subgroups of cells to be optimized sequentially. Subsequently, the method 2800 selects cells to be optimized in each subgroup. Next, the method 2800 generates a new solution. Thereafter, the method 2800 determines whether or not to select the new solution at the system level.

If the new solution is selected at the system level, then the method 2800 determines whether or not to select the new solution at the cell level. If the new solution is selected at the system level, then the method 2800 proceeds to learn from its experience. When learning from the solution, the method 2800 may record the solution, and update the models/parameters. After learning from the experience, the method 2800 determines whether to terminate the subgroup. If the subgroup is terminated, then the method 2800 re-selects cells to be optimized in the subgroup. If the subgroup is not terminated, then the method 2800 outputs the best solution, and then determines whether to terminate the SON session. If the new system is rejected at the system level or at the cell level, then the method 2800 reverts back.

Aspects of this disclosure provide techniques for dynamically adjusting cell-specific radio frequency (RF) configuration parameters (e.g., electrical antenna tilt, reference symbol (RS) pilot power, etc.) to optimize an objective function. In one embodiment, RF parameters of a single cell are adjusted to maximize a per-cell performance metric. In another embodiment, RF parameters for two or more cells are jointly adjusted to maximize a network performance metric, e.g., QoE in terms of coverage, capacity, etc.

In some embodiments, parameters are adjusted incrementally online. Parameters may be adjusted jointly for the different cells in a cluster, and the resultant feedback from UE measurement reports (MRs) may be observed continually in a closed loop for long term optimization. Real UE feedback (e.g., no propagation model estimate) in MRs to update the objective function, to identify cell state indicators, and to make step-wise parameter adjustments. In some embodiments, the objective function does not depend on UE location information.

As long as MRs (RSRP, RS-SINR or RSRQ) from representative UEs are available for a given parameter change, the objective function can be evaluated accurately. As such, the objective function may not require correct antenna tilt and power information. System objective functions and cell level metrics may be aggregations of UE state information (e.g., MRs, etc.) that don't require individual UE location for evaluation. Even if initial configuration parameters are inaccurate, they can be still adjusted in a meaningful direction using the fact that parameter changes lead to measurable changes in cell/system metrics.

Aspects of this disclosure provide adaptive simulated annealing (SA) techniques that combine online optimization of the real network via closed-loop SA-based guided random search and proactive offline optimization of relevant parameters and/or actions by efficiently exploring the solution space via simulated networks (e.g., Netlab, Unet) iteratively, in order to, learn from experiences, such as mistakes and rewards. This may allow actions to be selected based on the real-time feedback from the system. Embodiments may dynamically select and evolve the best possible actions for online optimization, which may allow the system to adapt to new unforeseen conditions or situations. Embodiments may also update the models and parameters used by SA and/or simulators based on online feedback from the system in real time, to provide fast convergence and to escape the trap of local optimization.

Aspects of this disclosure also provide embodiment SON optimization techniques that utilize an iterative learning approach to adjust wireless network configuration parameters. In particular, a controller iteratively generates and evaluates global solutions over a sequence of iterations. During this process, the controller uses experience obtained from evaluating global solutions during previous iterations when generating global solutions in subsequent iterations. This may be achieved by using the evaluation results to update parameters (e.g., topology model, traffic/usage patterns) of a heuristic/adaptive algorithm used to generate the global solutions. In this way, the controller learns more about the network (e.g., topology, conditions, traffic patterns, etc.) during each successive iteration, which ultimately allows the controller to more closely tailor global solutions to the network. As used herein, the term "global solution" refers to a set of local solutions for two or more wireless network coverage areas in a wireless network. Each "local solution" specifies one or more wireless configuration parameters for a particular wireless network coverage area. For example, in the context of CCO, a local solution may specify an antenna tilt of an access point in a wireless network coverage area and/or a transmit power level (e.g., uplink, downlink, or otherwise) for the wireless network coverage area. In some embodiments, the global solutions are evaluated during online implementation. In other embodiments, the global solutions are evaluated during offline simulation. In yet other embodiments, some global solutions are evaluated offline while others are evaluated online. For example, the best performing global solution obtained from a given number of iterative simulations may be implemented during an online test period. Global solutions may be generated in a manner that seeks to improve performance metrics of the worst performing cells. For example, wireless configuration parameters for a global solution may be selected in order improve performance metrics in wireless coverage areas associated with the highest costs.

Various techniques can be used to evaluate the global solutions. In some embodiments, each global solution is evaluated to determine whether it satisfies one or more global performance criteria, e.g., an overall cost, an average per-cell cost, etc. If the global solution does not satisfy the global performance criteria, then the controller may revert back to a previous global solution, e.g., a lowest cost global solution computed during an earlier iteration. If the global solution does satisfy the global performance criteria, then the controller may evaluate each local solution specified by the global solution to determine which local solutions satisfy corresponding local performance criteria. Different local performance criteria may be used to evaluate local solutions for different coverage areas. Local solutions that fail to satisfy their corresponding local performance criteria may be replaced with previous local solutions, e.g., a default local solution, a local solution defined by a global solution computed in a previous iteration, etc. In some embodiments, the global performance criteria is a relative benchmark established during a previous iteration (e.g., the lowest cost global solution computed prior to the current global solution), while the local performance criteria is an absolute benchmark, e.g., a minimum level of performance for a given cell.

In some embodiments, cost functions are used to evaluate global solution. The cost may be an overall cost for a set of coverage areas or an average per cell cost for a set of coverage areas. In the context of coverage and capacity optimization, a cost function for a global solution may include an RSRP parameter and an interference parameter, e.g., a SINR level, etc. In an embodiment, the RSRP component corresponds to a number of users reporting, or projected to report, an RSRP measurement below an RSRP threshold during a fixed period, and the interference component corresponds to a number of users reporting, or projected to report, an interference measurement above an interference threshold during the fixed period. In such an embodiment, the following cost function may be used: Cost=0.5*Num_UE(RSRP≤Thr_rsrp)+0.5*Num_UE (INT≥thr_int), where Num_UE(RSRP≤Thr_rsrp) is the number of UEs reporting, or projected to report, RSRP levels below an RSRP threshold during a fixed period, and Num_UE(INT≥thr_int) is the number of UEs reporting, or projected to report, interference levels below an interference threshold during the fixed period. In such an example, the interference levels may correspond to SINR levels obtained by measuring reference signals.

In some embodiments, some or all of the functions or processes of the one or more of the devices are implemented or supported by a computer program that is formed from computer readable program code and that is embodied in a computer readable medium. The phrase "code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. Upon execution, the computer program may detect core traces, convert the core traces into a hierarchical format, generate the gene function database, and determine preemption costs associated with the gene functions.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to and readily discernable by those skilled in the art. Accordingly, the above description of example embodiments does not define or constrain this disclosure. Other changes, substitutions, and alterations are also possible without departing from the scope of this disclosure as defined by the following claims.

What is claimed is:

1. A method for determining cell states to adjust antenna configuration parameters, the method comprising:
receiving, at a radio access node in a network, measurement reports from a plurality of user equipment devices;
performing, at the radio access node, a weak coverage analysis in response to the measurement reports to determine whether a cell provided by the radio access node is assigned a good coverage state or a weak coverage state, wherein the weak coverage analysis comprises
identifying a first number of user equipment devices served by the cell having good coverage; and
identifying at least one of a second number of user equipment devices served by the cell having weak edge coverage and a third number of user equipment devices served by the cell having weak interior coverage;
performing, at the radio access node, an overshooting analysis in response to the measurement reports to determine whether the cell provided by the radio access node is assigned an overshooter state or a non-overshooter state;
performing, at the radio access node, an interference analysis in response to the measurement reports to determine whether the cell provided by the radio access node is assigned an interferer state or a non-interferer state;
performing, at the radio access node, a quality analysis in response to the measurement reports to determine whether the cell provided by the radio access node is assigned a good quality state or a bad quality state; and
performing, at the radio access node, adjustments to antenna configuration parameters of the cell provided by the radio access node in response to the various states assigned to the cell.

2. The method of claim 1, wherein the weak coverage analysis further comprises:
determining a weak coverage ratio of user equipment devices served by the cell from the first, second, and third numbers;
assigning the good coverage state to the cell provided by the radio access network in response to the weak coverage ratio not exceeding a coverage ratio threshold; and
assigning the weak coverage state to the cell provided by the radio access network in response to the weak coverage ratio exceeding the coverage ratio threshold.

3. The method of claim 2, wherein the weak coverage analysis further comprises:
determining a weak edge ratio and a weak interior ratio of user equipment devices served by the cell from the first, second, and third numbers;
assigning a weak edge state to the cell provided by the radio access network in response to the weak edge ratio exceeding an edge ratio threshold; and
assigning a weak interior state to the cell provided by the radio access network in response to the weak interior ratio exceeding an interior ratio threshold.

4. The method of claim 1, wherein the overshooting analysis comprises:
computing inter site distances between the cell provided by the radio access node and other cells in the network;
determining a number of overlapped user equipment devices between the cell provided by the radio access network and the other cells in the network;
identifying whether the cell and a second cell in the network comprise an outlier cell pair based on whether a number of overlapped user equipment devices exceeds an overlap threshold for an associated inter site distance between the cell and the second cell;
determining whether the cell or the second cell is an overshooter based on a ranking of the cell and the second cell in one or more lists of cells ranked by at least one value reported in the measurement reports.

5. The method of claim 1, wherein the interference analysis comprises:
identifying user equipment devices in the network with a quality value below a threshold level;
determining whether the cell provided by the radio access node has a reference signal received power affecting the quality value of the user equipment devices in the network; and
maintaining a counter to record a number of user equipment devices affected by the cell.

6. The method of claim 5, wherein the interference analysis further comprises:
assigning a weak/non-interfering state to the cell in response to the number of user equipment devices affected by the cell being less than a first threshold value;
assigning a medium/single-interfering state to the cell in response to the number of user equipment devices affected by the cell being greater than the first threshold value and less than a second threshold; and
assigning a strong/multi-interfering state to the cell in response to the number of user equipment devices affected by the cell being greater than the second threshold value.

7. The method of claim 1, wherein the quality analysis further comprises:
comparing a quality value in the measurement reports of each user equipment device best served by the cell to a quality threshold;
determining a percentage of user equipment devices exceeding the quality threshold;
assigning a good quality state to the cell in response to the percentage exceeding a quality reference percentage; and
assigning a bad quality state to the cell in response to the percentage not exceeding a quality reference percentage.

8. The method of claim 1, wherein the adjustments to the antenna configuration parameters are performed without knowledge of the actual antenna configuration parameters.

9. The method of claim 1, wherein the adjustments to the antenna configuration parameters are performed without knowledge of the location of the user equipment devices transmitting the measurement reports.

10. The method of claim 1, wherein at least one intermediate state exists between at least one of the following pairs:
the good coverage state and the weak coverage state,
the interferer state and the non-interferer state,
the good quality state and the bad quality state,
and the cell provided by the radio access node is assigned to one or more of the at least one intermediate state.

11. The method of claim 1, wherein the overshooting analysis comprises:
determining whether a normalized overshoot counter for the cell exceeds a first threshold;
determining whether a fraction of measurement reports served by the cell exceeds a threshold minimum fraction of traffic that a cell must carry to be an overshooter; and
determining that the cell is an overshooter when the normalized overshoot counter for the cell exceeds the first threshold and the fraction of measurement reports served by the cell exceeds the threshold minimum fraction of traffic.

12. An apparatus for determining cell states to adjust antenna configuration parameters, the apparatus comprising:

a non-transitory readable medium storing programming instructions in memory; and a processor, upon executing the programming instructions, configured to:
- receive, at a radio access node in a network, measurement reports from a plurality of user equipment devices;
- perform, at the radio access node, a weak coverage analysis in response to the measurement reports to determine whether a cell provided by the radio access node is assigned a good coverage state or a weak coverage state;
- perform, at the radio access node, an overshooting analysis in response to the measurement reports to determine whether the cell provided by the radio access node is assigned an overshooter state or a non-overshooter state, the overshooting analysis comprising
  - computing inter site distances between the cell provided by the radio access node and other cells in the network;
  - determining a number of overlapped user equipment devices between the cell provided by the radio access network and the other cells in the network, wherein the overshooting is identified based on the number of overlapping user equipment devices in relation to the inter site distances between cells in an outlier pair of cells;
- perform, at the radio access node, an interference analysis in response to the measurement reports to determine whether the cell provided by the radio access node is assigned an interferer state or a non-interferer state;
- perform, at the radio access node, a quality analysis in response to the measurement reports to determine whether the cell provided by the radio access node is assigned a good quality state or a bad quality state; and
- perform, at the radio access node, adjustments to antenna configuration parameters of the cell provided by the radio access node in response to the various states assigned to the cell.

13. The apparatus of claim 12, wherein the weak coverage analysis comprises:
- identifying a first number of user equipment devices served by the cell having good coverage;
- identifying a second number of user equipment devices served by the cell having weak edge coverage; and
- identifying a third number of user equipment devices served by the cell having weak interior coverage.

14. The apparatus of claim 13, wherein the weak coverage analysis further comprises:
- determining a weak coverage ratio of user equipment devices served by the cell from the first, second, and third numbers;
- assigning the good coverage state to the cell provided by the radio access network in response to the weak coverage ratio not exceeding a coverage ratio threshold; and
- assigning the weak coverage state to the cell provided by the radio access network in response to the weak coverage ratio exceeding the coverage ratio threshold.

15. The apparatus of claim 14, wherein the weak coverage analysis further comprises:
- determining a weak edge ratio and a weak interior ratio of user equipment devices served by the cell from the first, second, and third numbers;
- assigning a weak edge state to the cell provided by the radio access network in response to the weak edge ratio exceeding an edge ratio threshold; and
- assigning a weak interior state to the cell provided by the radio access network in response to the weak interior ratio exceeding an interior ratio threshold.

16. The apparatus of claim 12, wherein the overshooting analysis further comprises:
- identifying whether the cell and a second cell in the network comprise the outlier cell pair based on whether the number of overlapped user equipment devices exceeds an overlap threshold for an associated inter site distance between the cell and the second cell; and
- determining whether the cell or the second cell is an overshooter candidate based on a ranking of the cell and the second cell in one or more lists of cells ranked by at least one value reported in the measurement reports.

17. The apparatus of claim 12, wherein the interference analysis comprises:
- identifying user equipment devices in the network with a quality value below a threshold level;
- determining whether the cell provided by the radio access node has a reference signal received power affecting the quality value of the user equipment devices in the network; and
- maintaining a counter to record a number of user equipment devices affected by the cell.

18. The apparatus of claim 17, wherein the interference analysis further comprises:
- assigning a weak/non-interfering state to the cell in response to the number of user equipment devices affected by the cell being less than a first threshold value;
- assigning a medium/single-interfering state to the cell in response to the number of user equipment devices affected by the cell being greater than the first threshold value and less than a second threshold; and
- assigning a strong/multi-interfering state to the cell in response to the number of user equipment devices affected by the cell being greater than the second threshold.

19. The apparatus of claim 12, wherein the quality analysis further comprises:
- compare a quality value in the measurement reports of each user equipment device best served by the cell to a quality threshold;
- determine a percentage of user equipment devices exceeding the quality threshold;
- assigning a good quality state to the cell in response to the percentage exceeding a quality reference percentage; and
- assigning a bad quality state to the cell in response to the percentage not exceeding a quality reference percentage.

20. The apparatus of claim 12, wherein the adjustments to the antenna configuration parameters are performed without knowledge of the actual antenna configuration parameters.

21. The apparatus of claim 12, wherein the adjustments to the antenna configuration parameters are performed without knowledge of the location of the user equipment devices transmitting the measurement reports.

22. The apparatus of claim 12, wherein at least one intermediate state exists between at least one of the following pairs:
- the good coverage state and the weak coverage state,
- the interferer state and the non-interferer state, the good quality state and the bad quality state,
and the cell provided by the radio access node is assigned to one or more of the at least one intermediate state.

23. The apparatus of claim 12, wherein the overshooting analysis comprises:
- determining whether a normalized overshoot counter for the cell exceeds a first threshold;
- determining whether a fraction of measurement reports served by the cell exceeds a threshold minimum fraction of traffic that a cell must carry to be an overshooter; and
- determining that the cell is an overshooter when the normalized overshoot counter for the cell exceeds the first threshold and the fraction of measurement reports served by the cell exceeds the threshold minimum fraction of traffic.

* * * * *